US007765785B2

(12) United States Patent
Kashmerick

(10) Patent No.: US 7,765,785 B2
(45) Date of Patent: Aug. 3, 2010

(54) COMBUSTION ENGINE

(76) Inventor: Gerald E. Kashmerick, 1120 Winston Park Ct., Brookfield, WI (US) 53045

( * ) Notice: Subject to any disclaimer, the term of this patent is extended or adjusted under 35 U.S.C. 154(b) by 424 days.

(21) Appl. No.: 11/512,454

(22) Filed: Aug. 29, 2006

(65) Prior Publication Data

US 2007/0044478 A1 Mar. 1, 2007

Related U.S. Application Data

(60) Provisional application No. 60/712,068, filed on Aug. 29, 2005.

(51) Int. Cl.
*F02C 5/00* (2006.01)
*F02C 3/00* (2006.01)

(52) U.S. Cl. ....................... 60/39.6; 60/39.62; 60/39.63

(58) Field of Classification Search .................. 60/39.6, 60/39.62, 39.63
See application file for complete search history.

(56) References Cited

U.S. PATENT DOCUMENTS

| | | | | |
|---|---|---|---|---|
| 1,622,010 | A * | 3/1927 | Summer | 60/39.62 |
| 1,983,351 | A | 12/1934 | Edwards | |
| 2,042,969 | A | 6/1936 | Snyder | |
| 2,093,339 | A | 9/1937 | Pippig | |
| 2,139,170 | A | 12/1938 | Murphy | |
| 2,295,619 | A * | 9/1942 | Wydler | 123/1 R |
| 2,728,332 | A | 12/1955 | Troberg | |
| 2,890,688 | A | 6/1959 | Goiot | |
| 2,970,581 | A | 2/1961 | Georges | |
| 3,741,175 | A | 6/1973 | Rouger | |
| 3,871,351 | A | 3/1975 | Geiger et al. | |
| 3,886,734 | A * | 6/1975 | Johnson | 60/39.63 |
| 3,929,107 | A | 12/1975 | Renger | |
| 3,970,056 | A | 7/1976 | Morris | |
| 3,973,393 | A * | 8/1976 | Vogelsang | 60/39.63 |
| 4,022,167 | A | 5/1977 | Kristiansen | |
| 4,116,191 | A | 9/1978 | Yanagihara et al. | |
| 4,160,432 | A | 7/1979 | Tsutsumi | |
| 4,215,659 | A | 8/1980 | Lowther | |
| 4,287,856 | A | 9/1981 | Enga | |
| 4,333,424 | A | 6/1982 | McFee | |
| 4,336,686 | A | 6/1982 | Porter | |
| 4,369,623 | A | 1/1983 | Johnson | |
| 4,399,654 | A | 8/1983 | David | |

(Continued)

FOREIGN PATENT DOCUMENTS

| | | |
|---|---|---|
| DE | 3406732 | 8/1985 |

(Continued)

*Primary Examiner*—Thomas E Denion
*Assistant Examiner*—Mary A Davis
(74) *Attorney, Agent, or Firm*—Boyle Fredrickson, S.C.

(57) ABSTRACT

A combustion engine that has at least a plurality of power strokes during a complete cycle of engine operation that is of compact packaging and Brayton cycle operable. In a preferred embodiment, a piston-cylinder arrangement used to compress air and deliver it to a combustion chamber where it is combusted along with fuel. The combustion gases are returned back to the piston-cylinder arrangement where they act on the piston to output power in a power stroke. A second power stroke can be implemented where additional combustion gases are available to extract additional power from. In a preferred embodiment, the same piston-cylinder arrangement receives the additional combustion gases from the combustion chamber in the second power stroke.

3 Claims, 12 Drawing Sheets

U.S. PATENT DOCUMENTS

| | | | |
|---|---|---|---|
| 4,476,821 A | 10/1984 | Robinson et al. | |
| 4,483,290 A | 11/1984 | Hass | |
| 4,493,296 A | 1/1985 | Williams | |
| 4,565,167 A | 1/1986 | Bryant | |
| 4,578,950 A | 4/1986 | Ruben | |
| 4,630,447 A | 12/1986 | Webber | |
| 4,854,279 A | 8/1989 | Seno | |
| 4,860,711 A | 8/1989 | Morikawa | |
| 4,864,814 A | 9/1989 | Albert | |
| 4,928,658 A | 5/1990 | Ferrenberg et al. | |
| 5,000,003 A | 3/1991 | Wicks | |
| 5,050,384 A | 9/1991 | Crockett | |
| 5,101,776 A | 4/1992 | Ma | |
| 5,179,839 A | 1/1993 | Bland | |
| 5,199,262 A | 4/1993 | Bell | |
| 5,201,907 A | 4/1993 | Hitomi et al. | |
| 5,237,964 A * | 8/1993 | Tomoiu | 123/25 C |
| 5,311,739 A | 5/1994 | Clark | |
| 5,341,771 A | 8/1994 | Riley | |
| 5,509,382 A | 4/1996 | Noland | |
| 5,842,453 A | 12/1998 | Hedelin | |
| 5,894,729 A | 4/1999 | Proeschel | |
| 6,012,280 A | 1/2000 | Hufton | |
| 6,058,904 A | 5/2000 | Kruse | |
| 6,085,506 A | 7/2000 | Fineblum | |
| 6,092,365 A | 7/2000 | Leidel | |
| 6,167,693 B1 | 1/2001 | Anderson | |
| 6,196,171 B1 | 3/2001 | Melchior | |
| 6,247,316 B1 | 6/2001 | Viteri | |
| 6,286,315 B1 | 9/2001 | Stachle | |
| 6,286,482 B1 | 9/2001 | Flynn et al. | |
| 6,289,666 B1 | 9/2001 | Ginter | |
| 6,334,300 B1 | 1/2002 | Mehail | |
| 6,354,268 B1 | 3/2002 | Beck et al. | |
| 6,390,785 B1 | 5/2002 | Sheyman et al. | |
| 6,405,704 B2 | 6/2002 | Kruse | |
| 6,418,708 B1 | 7/2002 | Mehail | |
| 6,474,058 B1 | 11/2002 | Warren | |
| 6,478,006 B1 | 11/2002 | Hedelin | |
| 6,490,854 B2 | 12/2002 | Mehail | |
| 6,502,533 B1 | 1/2003 | Meacham | |
| 6,523,349 B2 | 2/2003 | Viteri | |
| 6,526,935 B2 | 3/2003 | Shaw | |
| 6,530,211 B2 | 3/2003 | Holtzapple et al. | |
| 6,543,225 B2 | 4/2003 | Scuderi | |
| 6,543,411 B2 | 4/2003 | Raab et al. | |
| 6,564,556 B2 | 5/2003 | Ginter | |
| 6,568,186 B2 * | 5/2003 | Zaleski | 60/39.6 |
| 6,578,533 B1 | 6/2003 | Grav, Jr. | |
| 6,606,860 B2 | 8/2003 | McFarland | |
| 6,609,371 B2 | 8/2003 | Scuderi | |
| 6,672,063 B1 | 1/2004 | Proeschel | |
| 6,708,655 B2 | 3/2004 | Malonev et al. | |
| 6,718,751 B2 | 4/2004 | Mehail | |
| 6,722,127 B2 | 4/2004 | Scuderi | |
| 6,754,577 B2 | 6/2004 | Gross et al. | |
| 6,817,182 B2 | 11/2004 | Clawson | |
| 6,848,413 B1 | 2/2005 | Suder et al. | |
| 6,880,502 B2 | 4/2005 | Scuderi | |
| 6,886,326 B2 | 5/2005 | Holtzapple et al. | |
| 6,941,907 B2 | 9/2005 | Dixon | |
| 6,986,329 B2 | 1/2006 | Scuderi et al. | |
| 7,007,453 B2 | 3/2006 | Maisotsenko et al. | |
| 7,017,536 B2 | 3/2006 | Scuderi | |
| 7,020,554 B2 | 3/2006 | Roduner et al. | |
| 7,021,287 B2 | 4/2006 | Zhu et al. | |
| 2002/0043222 A1 * | 4/2002 | Singh | 123/25 C |
| 2002/0134345 A1 | 9/2002 | Adams | |

FOREIGN PATENT DOCUMENTS

| | | | |
|---|---|---|---|
| EP | 0095252 | | 12/1984 |
| EP | 126812 | A1 * | 12/1984 |
| JP | 57088215 | | 6/1982 |
| JP | 58096138 | | 6/1983 |
| JP | 4060166 | | 2/1992 |
| JP | 2005-002976 | | 1/2005 |
| JP | 2006-183459 | | 7/2006 |

* cited by examiner

COMBUSTION ENGINE

CROSS REFERENCE TO RELATED APPLICATION

This application claims priority under 35 U.S.C. Section 119(e) to U.S Provisional Application Ser. No. 60/712,068, filed Aug. 29, 2005, the entirety of which is hereby expressly incorporated herein by reference.

FIELD OF THE INVENTION

The present invention is directed to a combustion engine and more particularly to a flexible fuel capable reciprocating piston engine that is Brayton cycle operable.

BACKGROUND OF THE INVENTION

FIG. 1 is an engine cycle diagram depicting basic operation of a conventional four cycle internal combustion spark ignition piston engine that operates under the Otto cycle. Otto engines are used in powered vehicles, such as automobiles, trucks, and off-road vehicles, as well as in power equipment, such as lawnmowers, construction equipment, generators, air compressors, and the like. Otto engines typically mix a combustible fuel with air that is ignited to produce power. While gasoline is the most common type of combustible fuel that is used in an Otto engine, other types of fuels, including ethanol, methanol, propane, methane, and the like, can also be used. A popular combustible fuel in use today in the United States is a mixture of ethanol and gasoline with the ratio of ethanol to gasoline varying anywhere from as little as a few percent ethanol to as much as 85% ethanol.

FIG. 1 depicts Otto engine operation for an exemplary engine having at least one cylinder with two valves (not shown) per cylinder and a reciprocable piston received in each cylinder defining a combustion chamber therein. At the beginning of cycle 1, the intake stroke, the piston is located at or near a top-dead-center (TDC) position. Typically, at least air alone or in combination with fuel is drawn through an open intake valve (not shown) into the combustion chamber due to movement of the piston away from TDC toward a bottom-dead-center (BDC) position. While fuel can be mixed with air before the mixture is drawn into the combustion chamber, such as where a carburetor or single-point fuel injection is used, the fuel can be directly injected into the chamber such as where multi-point fuel injection is employed.

Once the intake stroke is completed, the intake valve closes in preparation for compression of the air-fuel mixture in the combustion chamber during the compression stroke, cycle 2. During the compression stroke, the piston moves within the cylinder toward TDC compressing the air-fuel mixture within the combustion chamber due to piston movement decreasing the volume of the chamber.

After the air-fuel mixture is suitably compressed, the mixture is ignited, typically with a spark discharged by a spark plug, during the power stroke, cycle 3, such that combustion of the mixture produces combustion gases that rapidly expand in the chamber increasing the pressure within the chamber. This causes a corresponding force to be exerted against the piston, which ultimately displaces the piston back towards BDC. Piston displacement is translated by a connecting rod linking it to a crankshaft into rotary power engine output.

To discharge the combustion gases after completion of the power stroke, an exhaust valve is opened during the exhaust stroke, cycle 4, enabling the gases to be expelled out an exhaust, such as an exhaust manifold that typically communicates with a muffler. After the exhaust stroke is finished, the exhaust valve closes. Thereafter, these four cycles repeat themselves as needed for continuous engine operation.

FIG. 2 illustrates exemplary pressure-volume plots of such an Otto engine showing a work plot of work inputted during the intake and compression strokes, and a power plot depicting net power outputted during the power stroke. Each plot assumes an ideal thermodynamic cycle, an 8:1 compression ratio, a specific heat ratio of approximately 1.4 for air, and combustion gases are exhausted during the exhaust stroke until a pressure of about 3.5 atmospheres when the exhaust valve is opened. The area under the dashed or phantom line in the work plot represents the engine power outputted during the power stroke shown in the power plot and the area between the abscissa and the bottom curve of the power plot represents the inputted work.

While theoretical maximum efficiency for an Otto engine represented by the plots in FIG. 2 is about 56%, in reality efficiency is far less. For example, it is not unusual for actual efficiencies to be less than half of theoretical in many Otto engine applications with typical maximum efficiency for an automobile engine being around 20-25%. Utility engines having a horsepower range of between 10 hp and 40 hp are usually even less efficient because they are often run rich to ensure consistent operation under a wide range of operating conditions.

While the Otto gasoline engine is the most popular engine in commercial use today, it is not without drawbacks and disadvantages. Most Otto engines cannot use more than one fuel without installation of expensive and sophisticated sensor systems that typically also require multi-point fuel injection to precisely meter fuel flow to accurately control air-fuel ratio. Similarly, almost all Otto engines require an expensive catalytic converter system to significantly reduce exhaust emissions. Additionally, Otto engines often operate at partial throttle where efficiency is even lower, often as low as about 10%.

These drawbacks and disadvantages are particularly true for utility engines that operate under the Otto cycle. These smaller engines typically have undesirably high exhaust emissions, typically in the range of 6-10 grams of hydrocarbons and nitrous oxides per horsepower hour, because it is not been presently found economical to equip them with catalytic converters. Because it is usually also not economical to equip such small engines with sophisticated mass flow sensors, engine control computers, fuel injection systems, gas recirculation systems, and the like, carbon monoxide emissions are usually also undesirably high because of the need to run rich to ensure consistent engine operation over a wide range of operating conditions.

Because of the need to keep utility engine costs economical, configuring these smaller utility engines to run rich to ensure consistent operation undesirably increases fuel consumption, which can range from 0.6 pounds per horsepower hour for wide open throttle up to as much as 1.3 pounds per horsepower hour at partial throttle. This also can cause combustion ignition and detonation problems with some engines also experiencing "after-bang" resulting from unburned fuel detonating when discharged from the engine during the exhaust stroke. Finally, such engines are usually loud, both during starting and during operation.

A Diesel engine operates somewhat similarly to an Otto engine except that it is a compression ignition engine where combustion in a Diesel engine takes place at constant volume rather than at constant pressure, which is possible with an Otto engine because it is a spark ignition engine. During the compression stroke of a Diesel engine, air in the combustion chamber is heated to a temperature high enough to ignite fuel injected into the combustion chamber without requiring any spark to incite ignition. While Diesel engines suffer from many of the same drawbacks and disadvantages as Otto engines, they also possess some unique drawbacks and disadvantages.

For example, while Diesel engines can use alternative fuels, fuel quality is especially critical because there is far less time to achieve vaporization and mixing with the compressed air to achieve compression ignition than there is for an Otto engine. Fuel must be injected right before the piston reaches the TDC position to ensure compression is great enough to achieve fuel ignition temperatures. If fuel quality is poor, such as if its Cetane rating is below 40, if it is not volatile enough, or if it has too high of viscosity, poor, no or incomplete combustion can result.

In addition, since fuel must be discharged into the combustion chamber at just the right time shortly before the piston reaches the TDC position to ensure the compressed air is hot enough to achieve compression ignition, more expensive fuel injectors and fuel injection control systems are required. Compressing air so it becomes hot enough to achieve compression ignition requires operation at a typical compression ratio of at least 14:1, which requires Diesel engines to be more strongly and heavily built. As a result, Diesel engines tend to cost significantly more such that very few utility engines are Diesel engines.

Another type of combustion engine most commonly associated with gas turbine engines is a Brayton engine that operates under the Brayton or Joule cycle. A Brayton cycle gas turbine engine typically includes a gas compressor, a burner or combustion chamber, and an expansion turbine where extracted work is outputted as power. Industrial gas turbines and jet engines are examples of such Brayton cycle engines.

However, before the Brayton cycle became so firmly associated with gas turbine engines, Brayton engines initially utilized a first reciprocating piston-cylinder arrangement as a compressor to compress air, a mixing chamber where fuel was mixed with compressed air where combustion of the air-fuel mixture took place, and another larger reciprocating piston-cylinder arrangement where expanded combustion gases acting on the piston provided power output. Some of the outputted power was inputted back into the engine as work to drive the compressor. Examples of Brayton-cycle piston-type combustion engines are disclosed in U.S. Pat. Nos. 5,894,729; 4,369,623; and 4,333,424. One other type of Brayton cycle piston-cylinder type engine is an Ericsson hot air engine, developed in the mid-1800's, which improved upon the original Brayton engine by including a recuperator or regenerator between the compressor and the expander that can increase engine efficiency.

While Brayton cycle gas turbine engines have enjoyed great commercial success, the Brayton cycle dual piston-cylinder engine counterpart to date has not. While a Brayton cycle dual piston-cylinder engine offers certain advantages over Otto and Diesel engines, significant hurdles have remained to date impeding their commercialization and acceptance. Therefore, improvements are desired that will facilitate commercialization and adoption of a Brayton cycle piston-cylinder type engine.

SUMMARY OF THE INVENTION

The present invention is directed to a combustion engine that preferably is capable of operating under the Brayton cycle using conventional engine components thereby advantageously minimizing engine packaging requirements previously imposed by prior engines of such type. An engine constructed in accordance with the present invention preferably is configurable to operate under an engine operating cycle that includes at least a plurality of power strokes per engine operating cycle. Such an engine preferably utilizes a common piston cylinder arrangement to not only compress gas before discharging it for combustion, it also accepts gases undergoing expansion after combustion to extract power therefrom. In doing so, a combustion chamber external to the piston-cylinder arrangement is provided in fluid flow communication for accepting compressed gas discharged from the piston-cylinder arrangement, combusting the gas when mixed with fuel, and returning the mixture to the same piston-cylinder arrangement where expanding combustion gases act upon the piston during the power stroke to displace it outputting power from the engine as a result.

Where additional power can be extracted because additional gas expansion can be harnessed, a second power stroke preferably is performed so additional combustion gases can enter the piston-cylinder arrangement after the combusted gases from the first power stroke are exhausted. After the second power stroke is completed, the combusted gases are also exhausted. Such an engine cycle can be configured to perform two, four, six, eight or even more power strokes per complete engine operating cycle.

Valve control preferably helps enable efficient operation to be achieved by controlling valve timing to optimize compression, combustion, expansion and exhaust during engine operation. In addition, such an engine constructed in accordance with the invention is advantageously capable of changing compression ratio during engine operation without changing engine geometry. For example, compression ratio can be increased by changing or otherwise regulating valve timing and fuel flow without having to change cylinder volume. Other factors preferably also can be varied in doing so.

Such an engine preferably is configurable to sustain continuous or substantially continuous combustion in a combustion chamber that preferably includes a air-fuel mixer, combustor in which combustion takes place, and which can be configured to help facilitate expansion such as by cooperating with a piston-cylinder arrangement that previously compressed and discharged air to the combustion chamber. In a preferred combustion chamber embodiment, the combustion chamber includes a combustor encompassed by a mixer that preferably absorbs heat lost from combustion using heat regeneration to increase efficiency.

An engine can have a plurality of piston-cylinder arrangements, each of which includes a piston reciprocable received in a cylinder. The piston preferably is connected by a connecting rod to an output, such as a crankshaft, out which power is transmitted from the engine. The cylinder preferably is capped by a cylinder head that includes at least a plurality, e.g., three or more, of valves that help regulate and coordinate gas flow during engine operation. The piston, cylinder and cylinder head define a working fluid chamber which not only compresses air before discharging it to the combustion chamber, it thereafter accepts combustion gases from the combustion chamber in extracting work therefrom due to the piston being displaced by the force of the combustion gases acting on it. Two, three, four or more piston-cylinder arrangements can be employed in an engine of the invention that preferably is configured to operate using the Brayton cycle having at least two power strokes using a common piston-cylinder arrangement.

One valve used to control gas and/or fluid flow during engine operation includes an intake valve that allows air to be drawn into the cylinder when charging it with air during the intake stroke. Another valve is a compressed air discharge valve that opens to permit compressed gas to be discharged from the piston-cylinder arrangement into the combustion chamber during the compression stroke. A still another valve is a combustion gas intake valve that opens to accept combustion gases undergoing expansion that are being discharged from the combustion chamber during a first power stroke. When the first power stroke is completed, an exhaust valve opens during an exhaust stroke to allow combusted gases in the cylinder to be exhausted.

A second power stroke is performed, preferably after the exhaust stroke, to permit additional combustion gas expansion to be captured and turned into work. This preferably occurs by discharging additional combustion gases from the combustion chamber into a piston-cylinder arrangement of substantially the same volume as the piston-cylinder arrangement where compression was performed during the compression stroke. In a preferred embodiment, they are one and the same. In another preferred embodiment, two such piston-cylinder arrangements are used to carry out the first and second power strokes substantially simultaneously. Where this is done, one of the piston-cylinder arrangements is the piston-cylinder arrangement where compression during the compression stroke was performed.

In another preferred implementation, the first and second power strokes occur one after another with at least one exhaust stroke occurring after each power stroke. Each such piston-cylinder arrangement preferably has substantially the same maximum volume as that which is performed compression during the compression stroke. In a preferred embodiment, the same piston-cylinder arrangement that performed air compression also performs each power stroke in succession or sequence.

Timing of valve opening and closing of at least one and preferably a plurality of the intake valve, the compressed air discharge valve, the combustion gas intake valve and the exhaust valve is configured to enable compression ratio to be changed during engine operation without changing piston-cylinder volume, including maximum volume, during engine operation. Fuel flow and air mass flow can also be varied and controlled to help do so.

Objects, features and advantages include at least one of the following: providing a combustion engine of piston-type construction that is capable of using present day engine components while still being of compact construction where are cylinders are sized the same; providing a Brayton cycle piston-type combustion engine that is efficient and fuel-type versatile; providing a combustion engine that is efficient over a wide range of operating conditions; providing a combustion engine that runs lean by keeping fuel-air mixture less than stoichiometric; providing a combustion engine that can be more easily started at a lower compression ratio because compression ratio can be increased during operation; providing a combustion engine that is quiet because combustion preferably is continuous and pressure pulses are minimized; providing a combustion engine of Brayton cycle piston-type construction that can be configured for utility engine use; and providing a combustion engine of simple, quick, and inexpensive manufacture that is durable, long-lasting, and easy-to-use, and providing a method of making, using, operating and assembling a combustion engine that is simple to implement, quick, labor-efficient, economical, and which requires relatively simple skills to perform and operate.

Various features and advantages of the present invention will also be made apparent from the following detailed description and the drawings.

BRIEF DESCRIPTION OF THE DRAWINGS

Preferred exemplary embodiments of the invention are illustrated in the accompanying drawings in which like reference numerals represent like parts throughout and in which.

Figure 1:
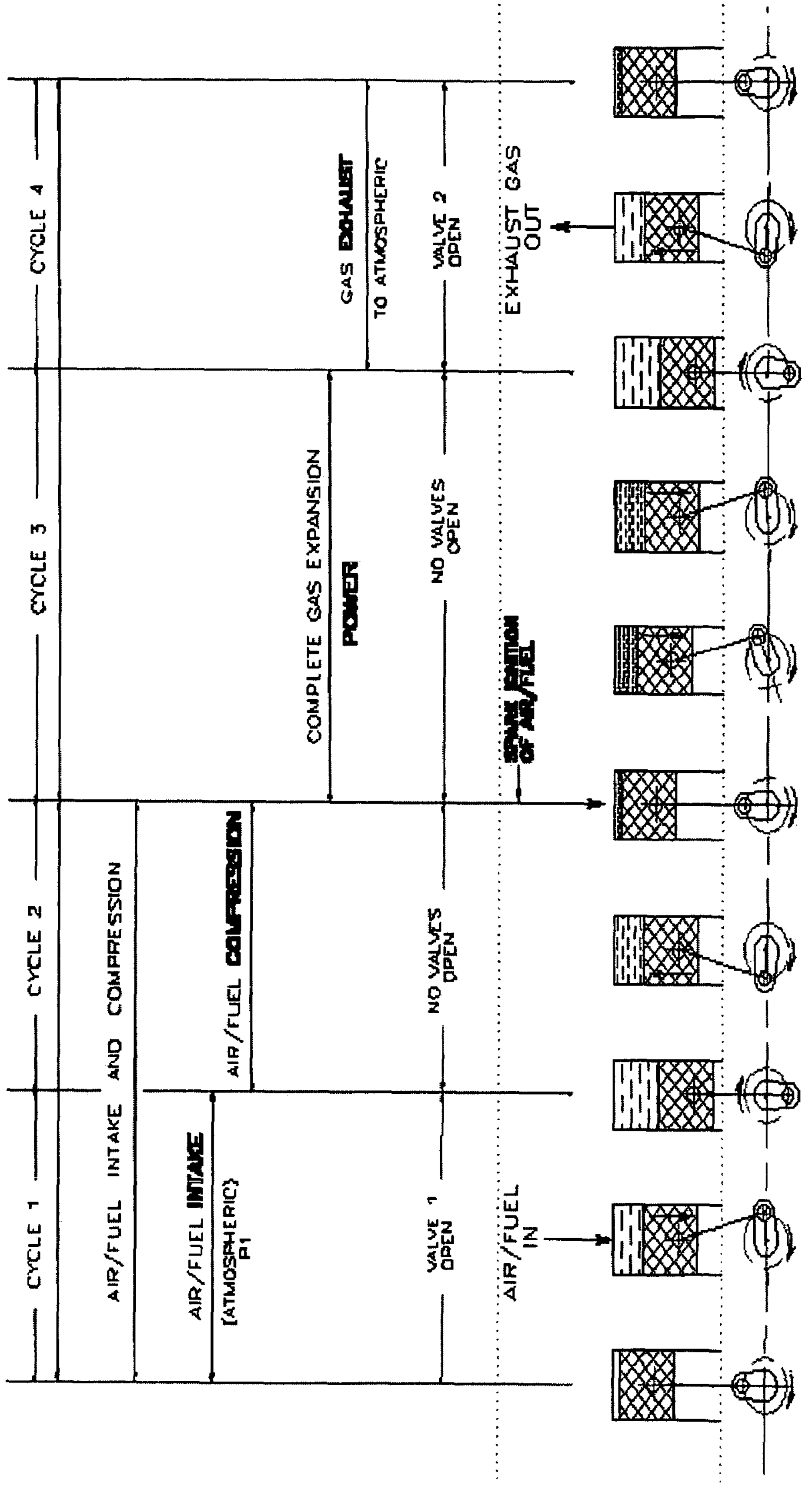
Figure 1 (Prior Art)
FIG. 1 is an engine operation cycle diagram for a prior art Otto cycle, spark ignition, internal combustion engine.
Figure 2:
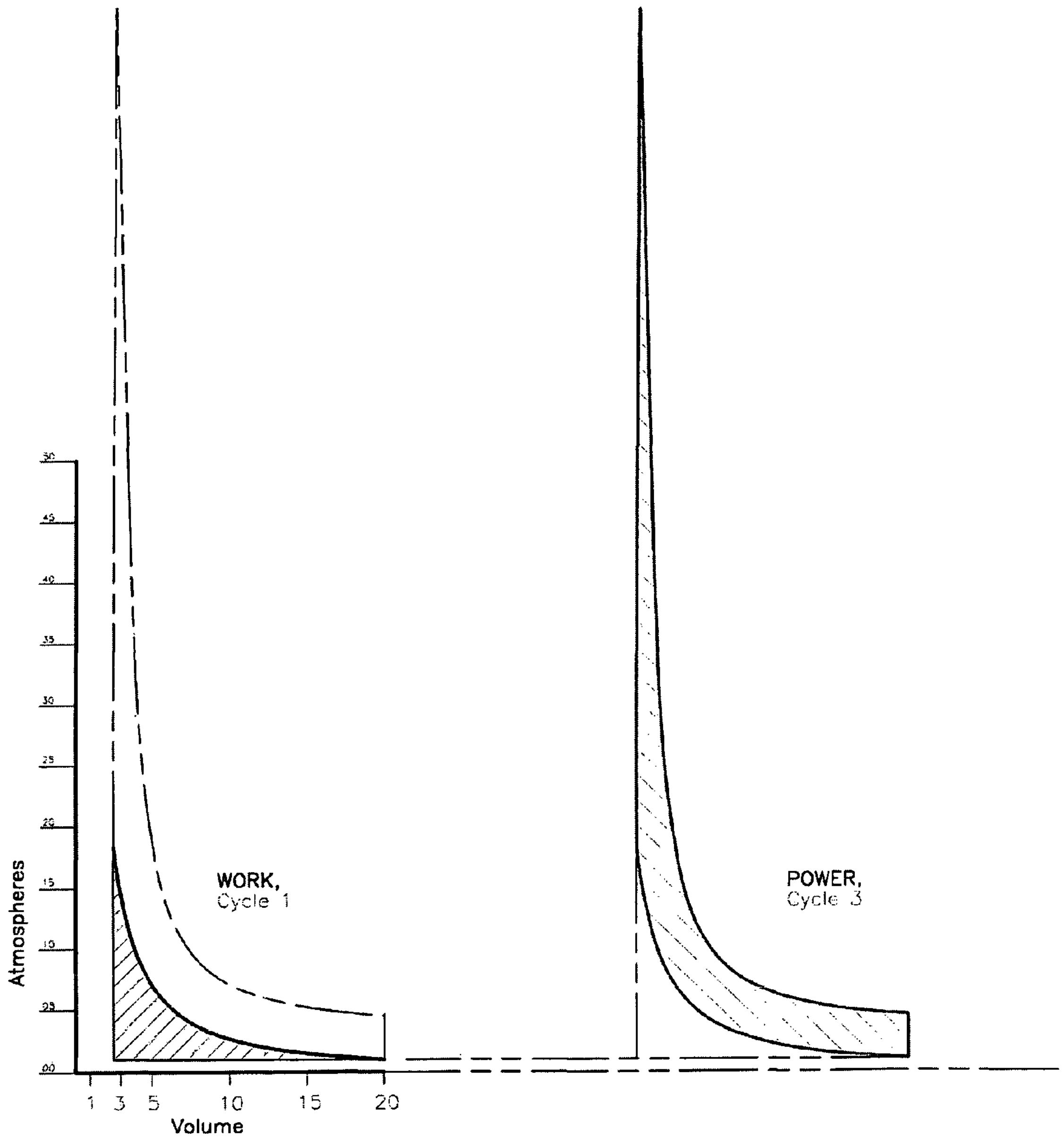
Figure 2 (Prior Art)
FIG. 2 illustrates work input and power output pressure volume plots for a prior art Otto cycle, spark ignition, internal combustion engine.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF AT LEAST ONE PREFERRED EMBODIMENT

Figure 3:
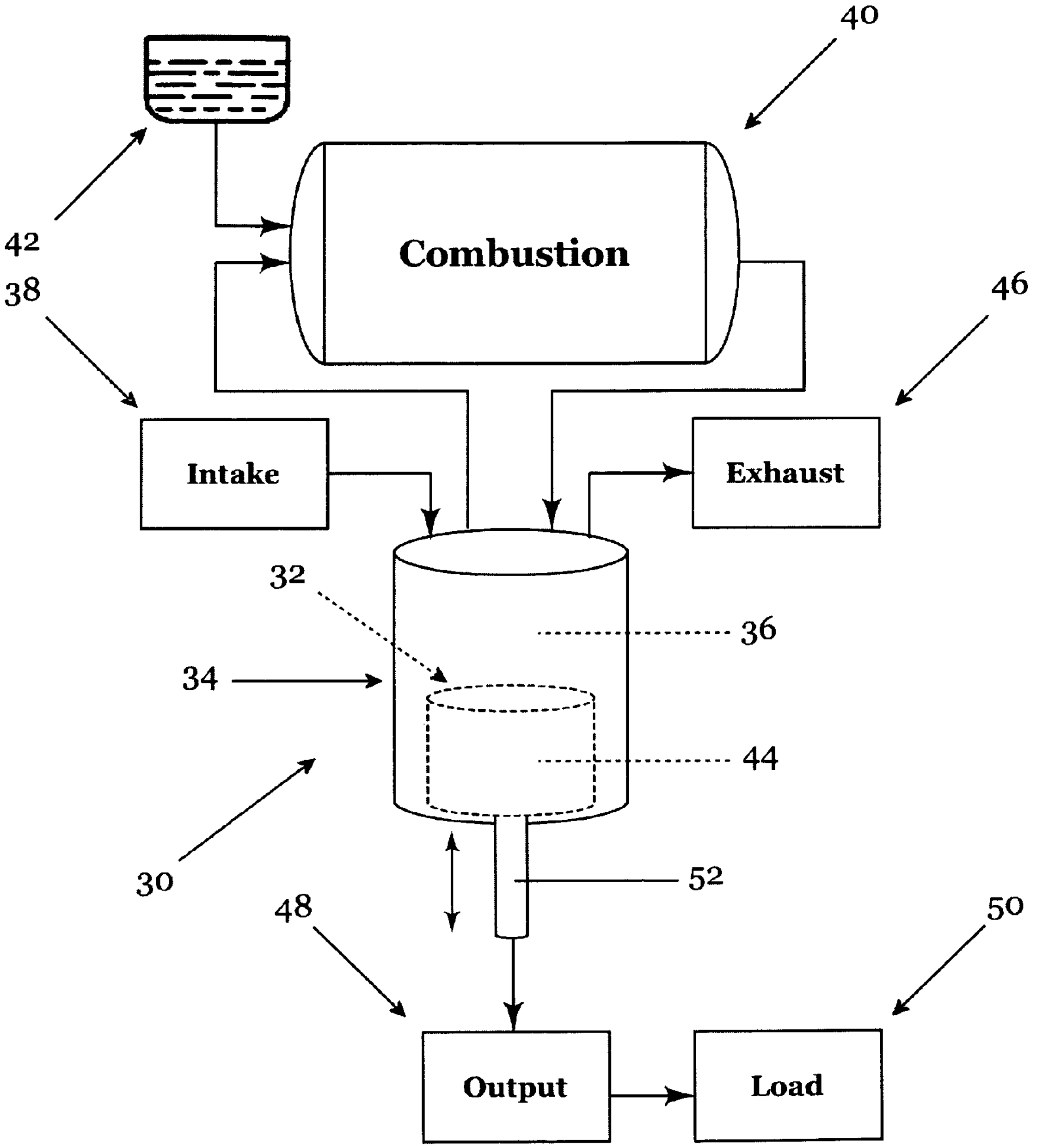
FIG. 3 is a schematic diagram of a Brayton cycle, piston-type combustion engine constructed in accordance with the present invention.

FIG. 3 illustrates a schematic depicting a preferred embodiment of a Brayton cycle piston-type combustion engine 30 of the present invention that includes a reciprocable piston 32 received in a cylinder 34 defining a working fluid chamber 36 in which fluid, preferably air, drawn into the chamber 36 from an intake 38, e.g., intake manifold, during an intake stroke is compressed during a compression stroke before the compressed fluid is delivered to a combustion chamber 40.

In the preferred embodiment shown in FIG. 3, fuel from a fuel source 42, such as a fuel tank or the like, is delivered to the combustion chamber 40 where it is mixed with compressed fluid in the chamber 40. Combustion occurs causing the mixture to expand preferably at substantially constant pressure before it is directed to the same working fluid chamber 36 that previously compressed the fluid during the compression stroke. Expansion resulting from combustion increases pressure in the working fluid chamber 36 causing a corresponding force to be applied against a head 44 (shown in phantom) of the piston 32. This applied force displaces the piston 32 causing work to be performed.

Thereafter, the combusted mixture is discharged from the working fluid chamber 36 via an exhaust 46, e.g., exhaust manifold, during an exhaust stroke. Piston displacement preferably facilitates discharge of the combusted mixture. In a preferred embodiment, combusted mixture is discharged via the exhaust 46 to the environment. If desired, the exhaust 46 can include or communicate with a muffler (not shown) or the like before reaching the environment.

As previously discussed, work is performed on the piston head 44 during the power stroke due to combustion mixture expansion displacing the piston 32. Piston displacement translates this work into engine power output. For example, in the preferred embodiment shown in FIG. 3, the piston 32 is coupled to an output 48 that is driven by displacement of the piston 32 during the power stroke. While the output 48 is preferably connected to a load 50, the load 50 can be directly coupled to the piston 32, if desired.

In one preferred embodiment, the piston 32 is coupled to the output 48 by an elongate connecting rod 52 that extends outwardly from the piston head 44. For example, where the output 48 is or includes an output shaft (not shown), such as a rotary crankshaft or the like, the connecting rod 52 is pivotally connected at or adjacent one end to the output shaft preferably by a coupling (not shown) and bearing arrangement (also not shown) between the coupling and shaft. The rod 52 preferably is also pivotally connected in the same or like manner at its other end to the piston head 44.

The output 48 preferably is connected to a load 50. For example, where the output 48 is an output shaft, such as a crankshaft, it can be connected to a load 50, such as a wheel, blade, cutter, head, chain, tines, propeller, pump, alternator, wheel(s), track(s), or the like. If desired, a drivetrain (not shown) can be provided as part of the output 48 or between the output 48 and load 50, if desired. Where a drivetrain is employed, it preferably includes one or more of the following: a transmission, e.g., gearbox, a clutch, a hydrodynamic coupling, a torque converter, a differential, and/or a control system.

Where additional work can be extracted from expanding combustion mixture remaining in the combustion chamber 40, a second power stroke preferably is implemented after the exhaust stroke. Of course, a second exhaust stroke preferably also is then implemented to discharge the combusted mixture from the working fluid chamber 36 when the second power stroke is finished. Whether four or six stroke or six cycle operation is contemplated, the aforementioned strokes or cycles repeat themselves in the same order as described above over and over again during engine operation typically until engine operation is stopped. Stopping engine operation can be accomplished by shutting the engine off, stopping fuel flow to the combustion chamber 40, ceasing ignition where ignition is required to sustain combustion, or in another manner.

Figure 4:
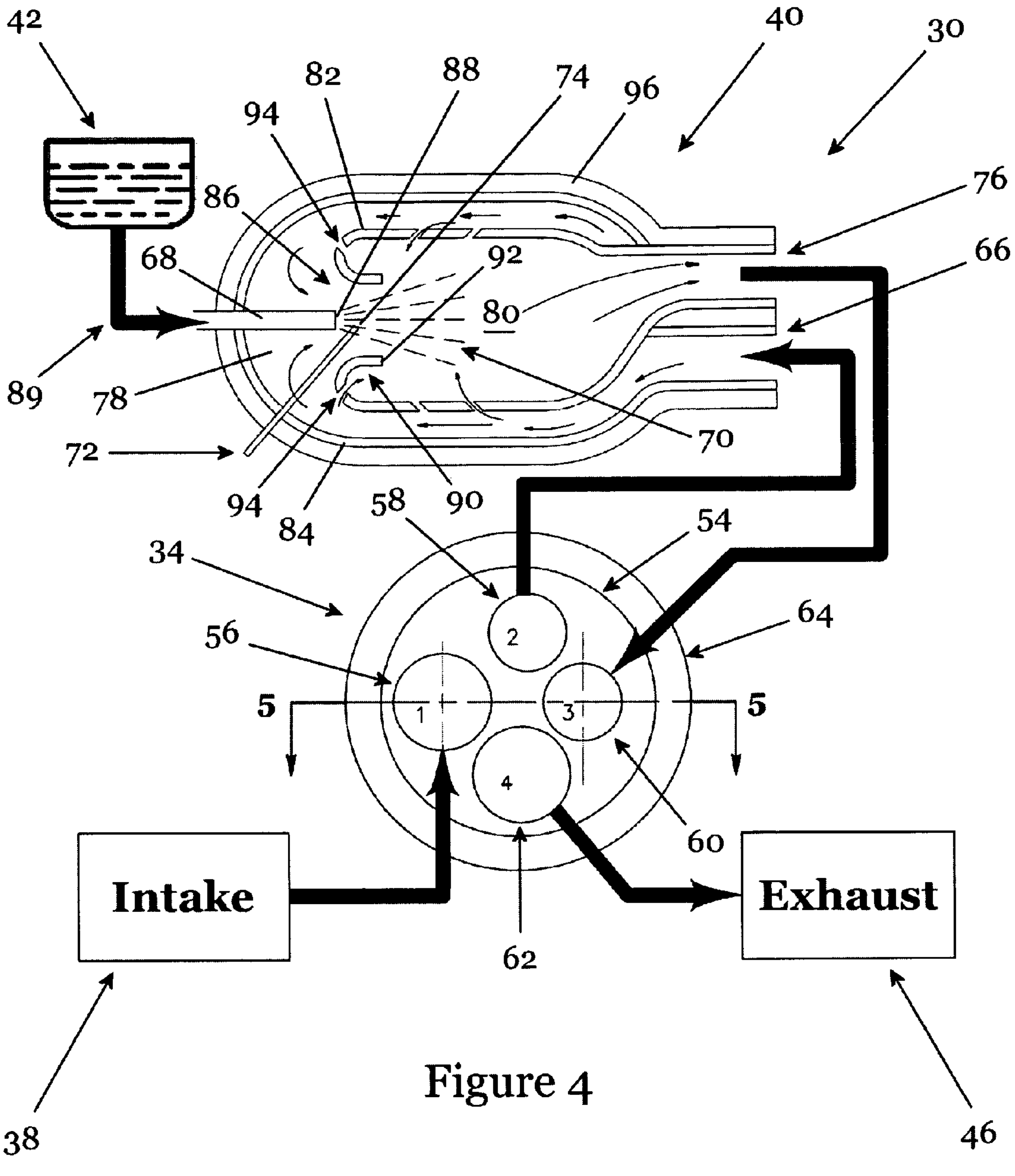
FIG. 4 is a schematic diagram depicting a preferred embodiment of the Brayton cycle combustion engine of FIG. 3 in more detail.

FIG. 4 illustrates a preferred embodiment of a Brayton cycle piston-type combustion engine 30 constructed and configured to operate in accordance with the present invention. The engine 30 includes a cylinder head 54 that defines a top wall of the cylinder 34 and has at least four valves 56, 58, 60 and 62 for enabling fluid flow into and out of the working fluid chamber 36. The cylinder head 54, a sidewall 64 of the cylinder 34, and the top of the piston head 44 preferably define the working fluid chamber 36. During engine operation, the volume of the chamber 36 varies relative to displacement of the piston 32. For example, when the head 44 of the piston 32 is located at top-dead-center (TDC), chamber volume is at a minimum. When the head 44 of the piston 32 is located at bottom-dead-center (BDC), chamber volume is at a maximum.

For the purposes of explaining the construction and operation of the engine embodiment depicted in FIG. 4, air will be used as an exemplary fluid drawn into the cylinder 34 during the intake stroke and gasoline will be used as an exemplary fuel mixed with the air in preparation for combustion and expansion during the power stroke. This is because an engine constructed in accordance with the present invention contemplates being configured to be able to use such a preferred air-fuel combination.

It is an advantage that an engine constructed in accordance with the present invention can operate using a wide range of fuels as well as fluids with which fuel can be mixed before combustion. In a presently preferred method of operation, one such fluid which an engine constructed and configured in accordance with the invention is an oxygen containing gas that preferably is air or the like. As further evidence of the versatility and flexibility of an engine constructed in accordance with the invention, fuels including gasoline, diesel fuel, alcohol, e.g., methyl and ethyl alcohol, methane, propane including LPG, hydrogen, seed oil(s), cooking oil(s), as well as other flammable fluids can be used. Fuel mixtures including E85, E20, and other mixtures of two or more such fuels also advantageously be used.

Air is drawn into the cylinder 34 as the piston 32 moves toward the BDC position. To enable air to be drawn into the cylinder 34, an air intake valve 56, valve 1 in FIG. 4, is opened and remains open for enough time for a sufficient volume of air to enter the cylinder 34. After this occurs, the air intake valve 56 closes. Where it is desired to further raise the compression ratio, turbocharging or supercharging can be employed. For example, the intake 38 can include a turbocharger or a supercharger (not shown). Alternatively, if desired, a turbocharger or supercharger can be located between the intake 38 and the air intake valve 56.

In one preferred method of operation of the engine 30 depicted in FIG. 4, the air intake valve 56 (valve 1) closes at or near when the piston 32 reaches the BDC position. In another preferred implementation, the valve 56 is closed shortly after the piston 32 passes beyond the BDC position. In either case, after the valve 56 closes and the piston 32 begins moving toward the TDC position, cylinder volume begins to decrease thereby compressing the air in the cylinder 34 during the compression stroke. Volume steadily decreases until the piston 32 approaches or even reaches the TDC position such that maximum compression is reached. All of the valves 56, 58, 60 and 62 preferably remain closed during the compression stroke.

In one preferred engine construction, the piston 32, cylinder 34, and cylinder head 54 are chosen so the change in cylinder volume during the compression stroke produces a compression ratio of at least 3:1 and preferably at least about 8:1 or higher. In one preferred embodiment, the cylinder volume differential between minimum and maximum cylinder volumes is selected to provide a compression ratio of at least 12:1. It is another advantage of a Brayton cycle piston-type combustion engine constructed in accordance with the invention that it can be operated at such a wide range of compression ratios. Being able to do so enables compression ratio to be varied in accordance with: engine operating requirements including power and efficiency requirements, fuel type, ambient conditions, and the like.

In one preferred method of operation, the engine 30 is initially operated at a compression ratio of less than 8:1 to reduce the power required to start the engine. Doing so preferably also enables use of a method of starting the engine 30 that is different and advantageously quieter than traditional flywheel ring gear and start pinion internal combustion engine starting arrangements, which have a tendency to be noisy during use. Thereafter, compression ratio preferably is increased to increase not only engine efficiency but engine power output as well.

When the compression stroke is completed, a compressed air discharge valve 58, valve 2, is opened permitting compressed air in the cylinder 34 to flow from the cylinder into the combustion chamber 40. The valve 58 preferably remains open long enough for a sufficient or desired volume of compressed air to be discharged into the chamber 40. In a preferred embodiment, when the compression stroke is completed and/or in the process of being carried out, compression of air preferably occurs at a certain constant pressure for at least part of the compression stroke. In a preferred implementation, air compression preferably occurs at substantially constant pressure for part of the compression stroke near the end of the compression stroke.

To minimize heat loss, any conduit or piping through which compressed air passes before reaching the combustion chamber 40 preferably is constructed of a thermally insulating material and/or insulated with a thermally insulating material. Emissive coatings, formulations, and the like, heat reflecting and heat reflective arrangements, and other heat loss reducing arrangements can also be employed in a manner that helps minimize compressed air heat loss to help maximize engine efficiency. Depending on the temperature of exhaust gases being discharged from the engine, exhaust heat, e.g. regenerative heating, can be extracted and used to further heat compressed air entering the combustion chamber 40 to help increase efficiency. It also can be extracted and used to heat the contents of the chamber 40, including compressed air entering the chamber 40.

While the engine 30 shown in FIG. 4 depicts a combustion chamber 40 located some distance away from the cylinder 34, the chamber 40 preferably is located as close to the cylinder 34 as possible to minimize the amount of work in the form of pumping losses that occurs during discharge of compressed air from the cylinder 32 into the chamber 40. For example, in one preferred embodiment that is not shown in the drawing figures, the combustion chamber is formed as part of the cylinder head. Such a cylinder head can have the combustion chamber integrally formed in it, such as by molding, casting or using another forming process that can require at least some machining or the like.

As is shown in FIG. 4, compressed air from the cylinder 34 flows through the open discharge valve 58 (valve 2) into an inlet 66 in the combustion chamber 40 until pressure equalization occurs and/or the valve 58 closes. Preferably, the dwell time or time the valve 58 is open is selected to help keep the pressure of the compressed air entering the chamber 40 at or near the maximum pressure it was compressed during the compression stroke. In one preferred method of operation, the valve 58 preferably is closed no later than when the piston 32 reaches TDC. In another preferred method implementation, the valve 58 is closed shortly after the piston 32 reaches TDC and begins moving back toward BDC. Routine testing and experimentation can also be used in determining compressed air discharge valve dwell time.

Compressed air entering the combustion chamber 40 flows toward a fuel port 68 from which fuel 70 from the fuel tank 42 is delivered into the chamber 40. Fuel 70 preferably is expelled from the port 68 outwardly into the combustion chamber 40 in a manner that facilitates mixing of the fuel 70 with the compressed air flowing through the chamber 40 in the vicinity of the port 68.

At or after fuel mixes with the air, the air-fuel mixture combusts creating combustion gases that rapidly expand causing a corresponding rise in pressure and/or volume at that pressure. An igniter 72 in the vicinity of the air-fuel mixture can be used to ignite the mixture to cause it to combust. Where combustion is or tends to be self-sustaining, the igniter 72 is only used as needed to ensure combustion occurs in the desired manner. For example, where combustion is continuous, the igniter 72 may only be needed to initially ignite the air-fuel mixture with combustion continuing onward thereafter until engine operation is stopped. In another preferred embodiment, a sensor (not shown) is employed to help monitor combustion such that the igniter 72 is only operated as needed to restart combustion, to improve combustion, and/or to otherwise facilitate or optimize combustion.

In a preferred embodiment, the igniter 72 is a spark generating device, such as a spark plug or the like. In another preferred embodiment, the igniter 72 can be a device that is heated to a temperature sufficient to cause ignition of the air-fuel mixture. In a still further preferred embodiment, a plasma generator can be employed. Of course, other types of igniters and other igniter configurations can be used.

While the igniter 72 is depicted as being positioned with its ignition end 74 downstream and in the path of fuel 70 expelled from the fuel port 68, the portion of the igniter 72 that effects ignition can be located elsewhere. For example, the ignition end 74 of an igniter 72 that is configured to discharge a spark can be positioned further downstream of the fuel port, such as preferably adjacent an end of the combustion chamber 40 opposite the fuel port 68.

During combustion, a combustion gas intake valve 60, valve 3, is opened so the expanding combustion gases can exit from an outlet 76 of the combustion chamber 40 and enter the cylinder 34 where the gases drive the piston 32 toward BDC causing power to be outputted. Preferably, opening of the combustion gas intake valve 60 (valve 3) is timed relative to the closing of the compressed air discharge valve 58 (valve 2) to optimize engine power output. For example, the combustion gas intake valve 60 preferably opens as quickly as possible after the compressed air discharge valve 58 closes. In one preferred engine operating configuration, the combustion gas intake valve 60 opens immediately after the compressed air discharge valve 58 closes. In another preferred configuration, the gas intake valve 60 opens substantially simultaneously with the closing of the compressed air discharge valve 58.

The combustion chamber 40 depicted in FIG. 4 includes an annular mixing section 78 that encompasses or encircles at least a substantial part of an internal combustor 80 where the air-fuel mixture is ignited causing combustion to occur. A common sidewall 82 that separates the mixer 78 from the combustor 80 preferably is of perforate construction or the like to facilitate not only mixing but also improve completeness of combustion. Placement of the mixer 78 so it surrounds the combustor 80 improves efficiency because at least a substantial amount of heat lost from the combustor 80 is beneficially transferred to compressed air in the mixer 78 as a result thereby providing heat recovery.

The mixer 78 is further defined by a sidewall 84 located outwardly of the perforate common sidewall 82. The outer sidewall 84 is of non-perforate sealed construction to maintain the pressure of entering compressed air as well as that of combustion gases undergoing expansion. The outer sidewall 84 preferably is configured to impart an oblong shape to the mixer 78 defining a sleeve with the common sidewall 82 that surrounds the combustor 80. The common sidewall 82 has an opening at an end opposite the inlet and outlet of the combustion chamber 40 that defines a combustor mouth 86 that helps channel compressed air flow along and around a discharge opening 88 of the fuel port 68 out which fuel 70 flows during combustion chamber operation. The common sidewall 82 preferably includes an annular curved lip 90 encompassing the mouth 86 that has an outer edge 92 extending generally axially toward the inlet 66 and outlet 76 of the combustion chamber 40.

This arrangement helps facilitate mixing by directing compressed air flow entering the mouth 86 of the combustor 80 so it converges at a point at and/or in front of the fuel port discharge opening 88. In addition, depending on the velocity of the compressed air flow passing by the fuel port opening 88, directing the compressed air flow in this manner can help encourage fuel flow where the velocity of the compressed air flow is great enough to produce a sufficient pressure differential at the opening 88.

Such an arrangement in combination with perforations 94 in the common sidewall 82 help create turbulence in the combustor 80, which also facilitates mixing. In a preferred embodiment, the combination of funneling compressed air flow so it converges adjacent to but downstream of the fuel port discharge opening 88 and perforate common sidewall construction not only encourages turbulent mixing, it also advantageously helps facilitate vaporization of fuel 70 in the combustor 80 where such fuel is not already in a vaporous or gaseous state.

To help minimize combustion chamber heat loss, including heat loss from compressed air flowing through the mixer 78, the combustion chamber 40 is of thermally insulated construction. For example, in the preferred combustion chamber embodiment illustrated in FIG. 4, a layer of insulation 96 surrounds the outside surface of the outer sidewall 84. Such insulation not only helps prevent heat loss from compressed air in the chamber 40, it also helps reduce combustion heat loss from the combustor 80 as well.

The fuel port 68 shown in FIG. 4 is of tubular and elongate construction. The port is in fluid-flow communication with the fuel tank 42, from which fuel 70 is supplied. The fuel system depicted in FIG. 4 preferably is a pressurized fuel delivery system 89. To help ensure fuel pressure is greater than the pressure within the combustion chamber 40, a fuel pump, such as a diaphragm pump, a turbine pump, or a gerotor pump, can be used to draw fuel 70 from the tank and discharge it under sufficient pressure from the fuel port 68. Such a fuel delivery system preferably delivers fuel 70 out the port 68 at a pressure substantially greater than the gas pressure within the combustor 80 to help ensure consistent fuel flow and good control of fuel flow. While a simple fuel port tube or conduit like that shown in FIG. 4 can be used, a fuel injector or other type of fuel delivery device, including one that enable fuel metering to be performed, can also be used in place of or in addition to the fuel port 68.

Figure 5:
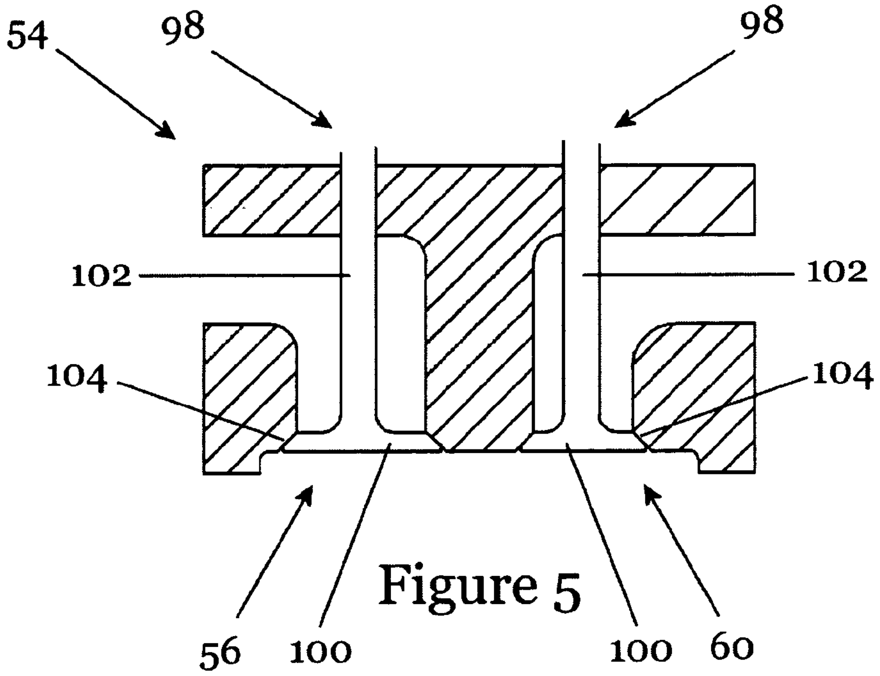
FIG. 5 is cross sectional view of take through section line 5-5 of the preferred cylinder head embodiment depicted in FIG. 4.

FIG. 5 illustrates a preferred cross-section of the cylinder head 54 shown in FIG. 4. Each valve 56 (valve 1) and 60 (valve 3) preferably is a poppet valve 98 having a valve head 100 and valve stem 102. The stem 102 can be biased, such as by a spring (not shown) or another biasing arrangement, toward a closed or open position. If desired, the stem 102 can be displaced by an actuator, such as an actuator of electromagnetic and/or electromechanical construction (not shown) that controls opening and closing of the valve 98. In a preferred embodiment, valve operation is controlled by a camshaft (not shown) or the like that includes at least one lobed cam (not shown) rotation of which controls how long the valve 98 remains open and stays closed. When the valve is closed, the valve head 100 seats against a valve seat 104 opposing fluid flow by preferably providing a fluid-tight seal therebetween.

Figure 6:
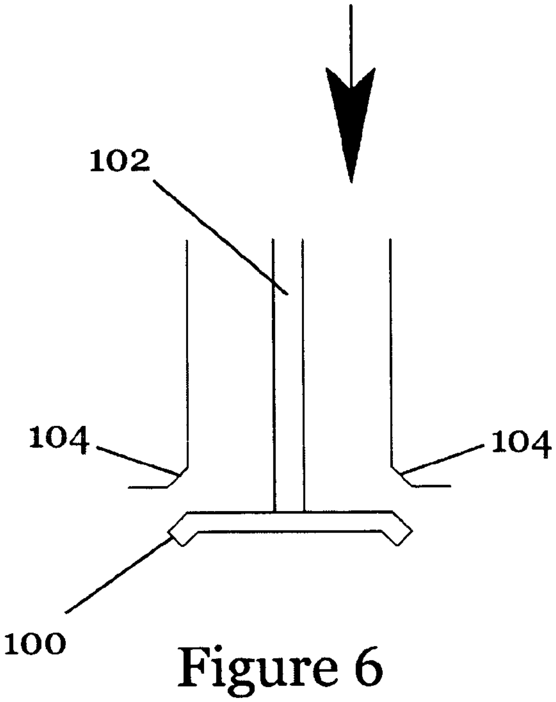
FIG. 6 is a side elevation view of a first embodiment of a poppet valve that opens in the direction of pressure and flow.
Figure 7:
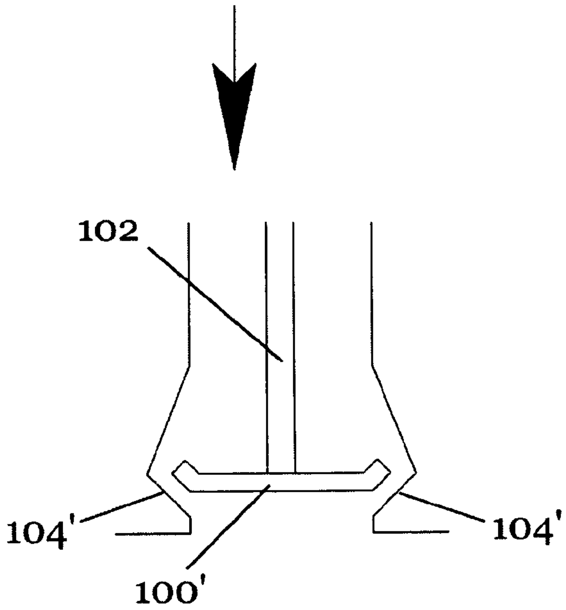
FIG. 7 is a side elevation view of a second embodiment of a poppet valve that closes in the direction of pressure and flow.

FIG. 6 illustrates one preferred embodiment of a poppet valve that can be used that can self-seat in a closed position where fluid flow is reverse the direction of the directional arrow indicator shown. FIG. 7 shows a second preferred embodiment of a poppet valve that can be used that can self-seat in a closed position where fluid flow is same as the direction of the directional arrow indicator shown.

In one preferred cylinder head embodiment, the compressed air discharge valve 58 (valve 2) preferably is a poppet valve of the type same as or like that shown in FIG. 6 and the combustion gas intake valve 60 (valve 3) preferably is a poppet valve of the type same as or like that shown in FIG. 7. Likewise, the air intake valve 56 (valve 1) preferably is a poppet valve of the type same as or like that shown in FIG. 7 and the exhaust valve 62 (valve 4) preferably is a poppet valve of the type same as or like that shown in FIG. 6. In another preferred embodiment, a valve arrangement that is the converse or reverse of the aforementioned valve arrangement is used.

Figure 8:
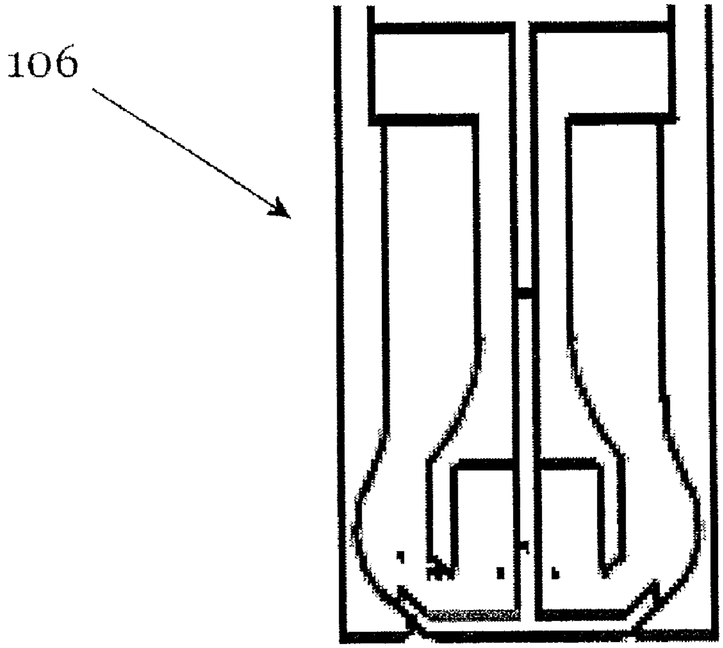
FIG. 8 is a side elevation view of a pressure-actuated valve.
Figure 9:
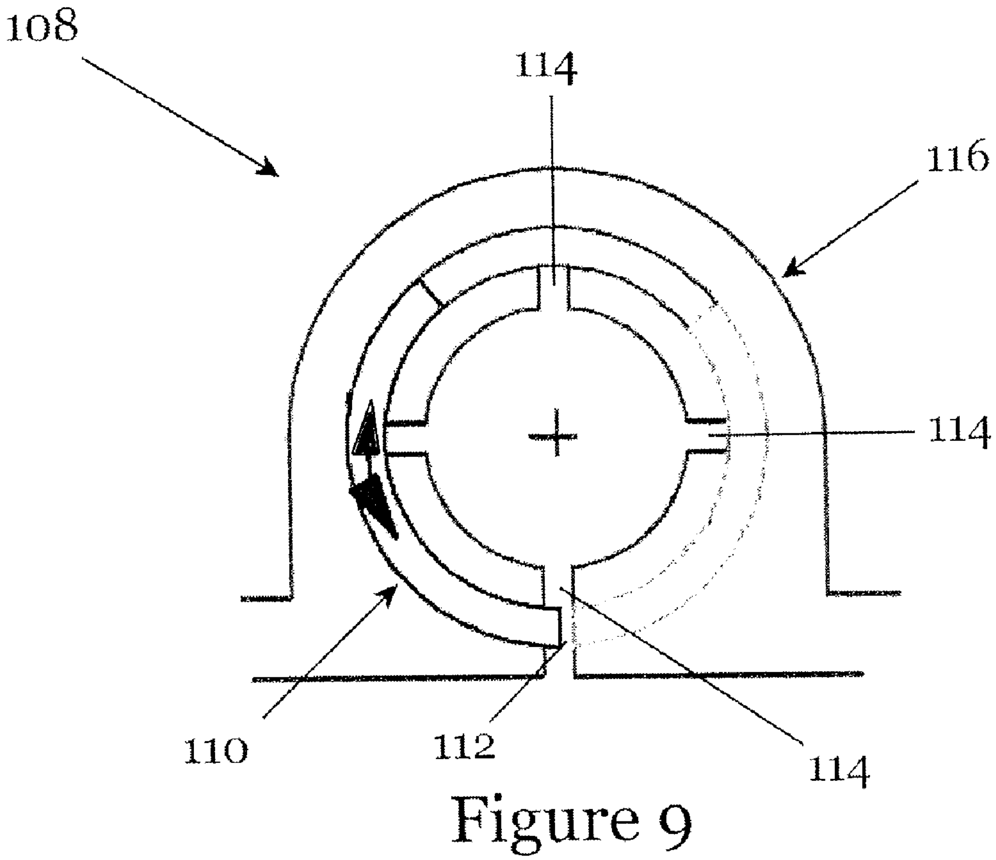
FIG. 9 is a front elevation view of a variable valve.

FIG. 8 illustrates another type of suitable valve 106 that is of needle valve type construction. FIG. 9 depicts one preferred but exemplary embodiment of a variable valve 108 whose timing and duration of valve opening, i.e., dwell, can be adjusted depending on factors that include engine operation, compression ratio, power, efficiency, noise, fuel type, etc. The variable valve 108 has a rotary slide 110 that includes at least one slot 112 that registers with a valve passage 114 in a valve body 116 permitting fluid flow there through and blocking fluid flow when the slide 110 is rotated to a position where it blocks the passage 114. An actuator (not shown), such as a rotary electromagnetic and/or electromechanical actuator (not shown) can be adapted to operate the valve. If desired, the valve 108 can also be mechanically driven, such as by a camshaft (not shown), a linkage arrangement (not shown), or another type of mechanical valve drive arrangement. If desired, another type of variable valve offering such control over valve timing and duration of valve opening can also be employed for any one of the valves 56, 58, 60 and 62 of the engine 30.

Figure 10:
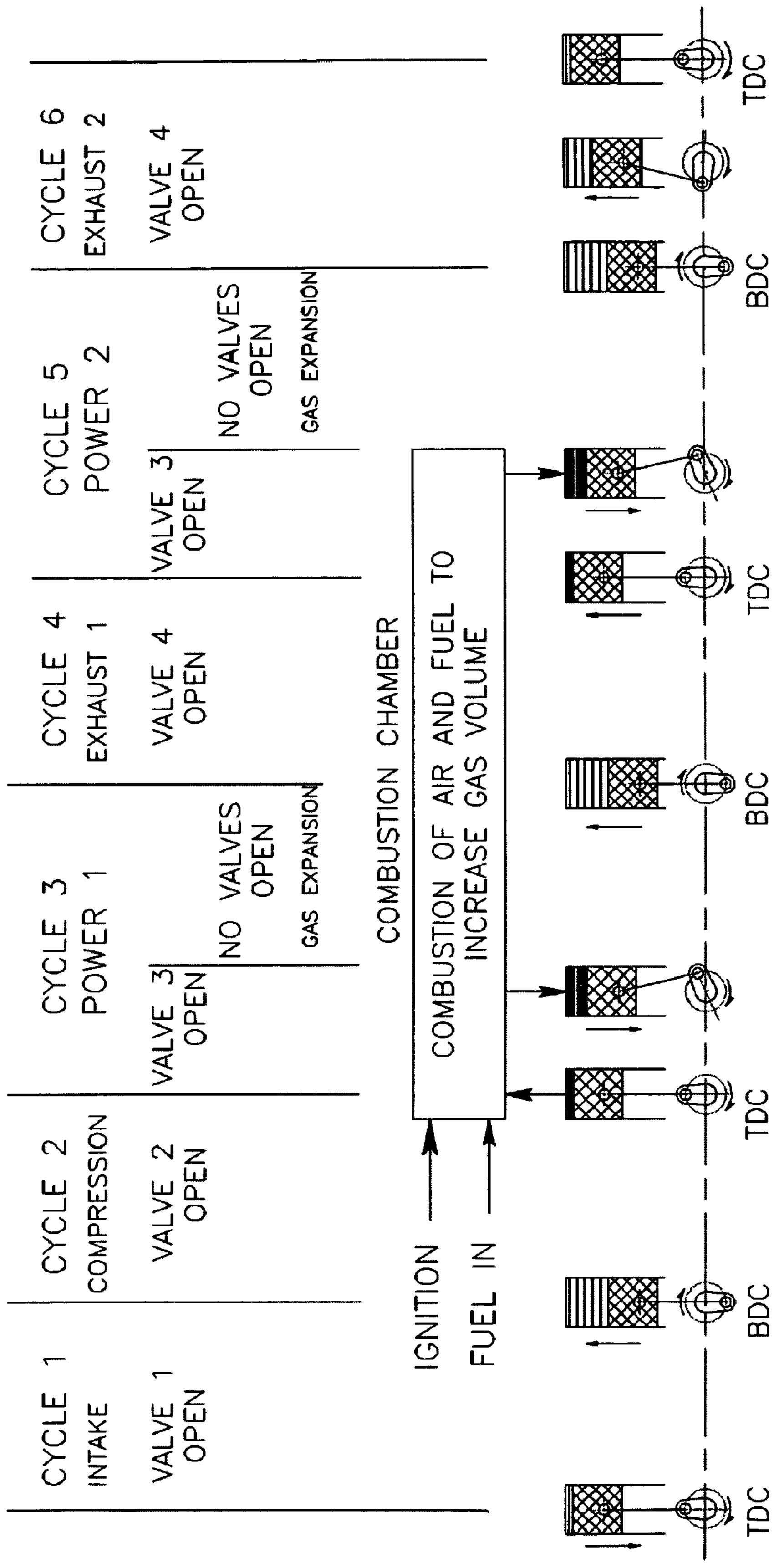
FIG. 10 is a preferred engine cycle diagram depicting six cycle engine operation.

FIG. 10 illustrates a preferred Brayton cycle, piston-type combustion engine cycle diagram for six cycle operation of the engine 30. At the beginning of cycle 1, the intake stroke, the head 44 of the piston 32 is at the TDC position. Work is inputted to displace the piston head 44 towards BDC while the air intake valve 56, valve 1, is open. As a result of the intake valve 56 being open, air is drawn into the cylinder 34 by suction created as a result of piston displacement towards BDC.

When the air intake stroke (cycle 1) is completed, the intake valve 56 (valve 1) is closed. In a preferred implementation, the compressed gas discharge valve 58 (valve 2) is appropriately opened during the compression stroke (cycle 2) while the piston 32 is displaced using inputted work towards the TDC position. Depending on the configuration of the engine 30, the present invention contemplates operation during the compression stroke with the discharge valve 58 remaining closed for at least part of the second cycle. For example, where engine operation upon startup is initially at a lower compression ratio, such as at a compression ratio of less than 8:1, the discharge valve 58 preferably remains open during the entire compression stroke. Thereafter, as compression builds reaching a compression ratio that is greater than the lower initial or startup compression ratio, such as at a compression ratio of 8:1 or greater in this example, the discharge valve 58 preferably remains closed for at least part of the time from the beginning of the compression stroke.

If desired, the compressed gas discharge valve 58 (valve 2) can be controlled independently of the other valves 56, 60 and 62, such as where the valve 58 is directly driven via a pneumatic, electronic, electromagnetic, and/or electromechanical actuator or the like. Where the valve 58 is of one-way valve construction, e.g., poppet valve, needle valve, or the like, its operation will be dependent upon the operation of the combustion gas intake valve 60 (valve 3), fuel input, compression ratio, and/or desired power output.

Where a discharge valve control regime is adopted that allows the discharge valve 58 to remain closed for at least part of the compression stroke, the time the valve is to remain closed, $DVt_c$, preferably relates to the air pressure compression desires to achieve. For example, in a preferred implementation, discharge valve close time, $DVt_c$, is chosen so the pressure of the compressed air discharged from the cylinder when the valve 58 is opened is substantially the same as the pressure within the combustion chamber 40. In a preferred implementation, $DVt_c$, is chosen so the pressure of the compressed air discharged from the cylinder 34 is substantially the same as the pressure within the combustion chamber 40 at or adjacent its inlet 66. In one preferred implementation, valve timing is controlled or otherwise regulated to achieve a compressed air discharge pressure that is within ±25% of the pressure within the combustion chamber 40 at or adjacent the inlet 66.

In one preferred method of operation, the discharge valve 58 remains open throughout substantially the entire compression stroke while the engine is operating at a first compression ratio, $CR_1$. When it is desired to increase the compression ratio, the discharge valve 58 remains closed for a period of time, $t_1$, preferably starting from the beginning of the compression stroke. In a preferred method implementation, the discharge valve close time, $DVt_c$, of the discharge valve 58 is increased from $t_1$ to a value greater than $t_1$ as compression ratio increases. This can be done to help bring about an increase in compression ratio and/or can also be done in response to increasing compression ratio occurring during engine operation.

One preferred implementation contemplates adjusting in response to a change in pressure sensed downstream of the cylinder, such as preferably within the combustion chamber 40 at or adjacent the inlet. As will be discussed below, the timing of the combustion gas intake valve 60 (valve 3) can be controlled to cause the pressure within the combustion chamber 40 to rise or fall. For example, where the combustion gas intake valve open time, $CGIVt_o$, is decreased to less than that needed to ensure optimal gas expansion during the two power strokes (cycle 4 and cycle 6) depicted in FIG. 10, gas pressure will build up within the combustion chamber 40 as a result. Where gas pressure in the combustion chamber 40 increases, the discharge valve close time, $DVt_c$, of the compressed air discharge valve 58 (valve 2) is increased by a sufficient amount to help ensure the pressure of the compressed gas discharged from the cylinder 34 is substantially the same as the pressure within the combustion chamber 40.

In one preferred engine embodiment, a variable valve, such as the valve 108 shown in FIG. 9, can be employed as the compressed gas discharge valve 58 enabling discharge valve close time, $DVt_c$, to be regulated during each compression stroke as needed either in response to a change in compression ratio and/or downstream pressure or to help bring about a change in compression ratio and/or downstream pressure. In one preferred compression stroke implementation, the discharge valve 58 stays closed for at least 5% of the compression stroke. In another preferred implementation, the valve 58 stays closed for at least 50% of the compression stroke. In still another implementation, the discharge valve close time, $DVt_c$, is selected so the discharge valve opens when the piston 32 is located at least within about ±5° of TDC. Other compressed gas discharge valve implementations and control regimes are possible.

After the compression stroke (cycle 2) is completed, the compressed air discharge valve 58 (valve 2) is closed if need be and the combustion gas intake valve 60 (valve 3) is opened beginning the first power stroke (cycle 3). The intake valve 60 remains open for less than the entire period of time it takes for the piston 32 to be driven to the BDC position by the expanding combustion gases that have entered the cylinder 34. In one preferred implementation, the combustion gas intake valve open time, $CGIVt_o$, is selected to be less than 50% of the time it takes for the piston to travel from the TDC position to the BDC position. In another preferred implementation, $CGIVt_o$, is selected to be long enough to maximize the amount of combustion gas expansion, including any expansion that takes place within the cylinder 34 after the intake valve 60 closes.

Where it is assumed that at least one more power stroke (e.g., cycle 5) takes place after the first power stroke (cycle 3), the combustion gas intake valve open time, $CGIVt_o$, is determined based on the maximum working fluid chamber volume within the cylinder, the current compression ratio, and the expansion ratio resulting from the fuel type or mixture as well as the fuel-air ratio resulting from combustion of the mixture in the combustion chamber 40. In one preferred implementation, a volumetric total amount of gas expansion occurring during combustion is determined based on this expansion ratio given the fuel type and/or mixture and the fuel-air ratio. If desired and suitable for use, the fuel-air ratio can be relative to stoichiometric. This volumetric total is then divided by the maximum working fluid chamber volume of the cylinder 34 times the number of power strokes per complete engine operating cycle. $CGIVt_o$ is then determined based on the time it will take for enough expanding combustion gases to enter the cylinder during each power stroke to optimize power obtained during each power stroke. Preferably, the value of $CGIVt_o$ obtained helps ensure that substantially complete expansion of the combustion gases takes place or substantially complete combustion gas expansion is approached thereby helping optimize engine operating efficiency.

After the first power stroke (cycle 3) is completed, the exhaust valve 62 is opened permitting the combusted expanded gases in the cylinder 34 to be exhausted from the cylinder 34 during a first exhaust stroke (cycle 4). Preferably, the exhaust valve 62 is opened at or after the piston 32 has reached BDC such that subsequent piston displacement toward TDC helps discharge the exhaust gases from the cylinder 34 during the exhaust stroke.

Upon completion of the first exhaust stroke (cycle 4), the exhaust valve 62 is closed. At or after the piston 32 reaches the TDC position, the combustion gas intake valve 60 is reopened to enable combustion gases whose expansion is not yet complete to enter the cylinder 34 during the second power stroke (cycle 5) and drive the piston 32 toward the BDC position extracting additional power from the combustion gases. While the combustion gas intake valve open time, $CGIVt_o$, can differ in the second power stroke, it can also be substantially the same, if desired.

In one preferred implementation of the $CGIVt_o$ determination method discussed above, $CGIVt_o$ for the first power stroke (cycle 3) preferably is shorter in duration than $CGIVt_o$ for the second power stroke (cycle 5). This is because combustion gases entering the cylinder 34 during the first power stroke causes the pressure of the combustion gases that remain upstream of the cylinder 34 to decrease from a maximum combustion gas pressure that existed before the combustion gas intake valve 60 opened during the first power stroke. As a result and where the maximum working fluid chamber volume remains unchanged in the cylinder 34, the value of $CGIVt_o$ for the first power stroke preferably will be determined or otherwise selected to be less (shorter) than the value of $CGIVt_o$ for the second power stroke. This is because the combustion gas intake valve 60 must remain open for a longer period of time during the second power stroke than it did for the first power stroke to maximize volumetric filling of the working fluid chamber of the cylinder 34 due to the lower gas pressure. Keeping the valve 60 open longer during the second power stroke preferably helps optimize operating efficiency by helping to maximize power extracted from the expanding combustion gases during the second power stroke.

After the second power stroke (cycle 5) is completed, the exhaust valve 62 is once again opened permitting the combusted expanded gases in the cylinder 34 to be exhausted from the cylinder 34 during a second exhaust stroke (cycle 6). Preferably, the exhaust valve 62 is also once again opened at or after the piston 32 has reached BDC such that piston displacement toward TDC helps discharge the exhaust gases from the cylinder 34 during the second exhaust stroke.

Upon completion of the complete six cycle engine operating cycle depicted in FIG. 10 in accordance with the present invention, the piston 32 preferably is located at or near TDC, enabling the six cycle engine operating cycle to be repeated as needed during engine operation.

Figure 11:
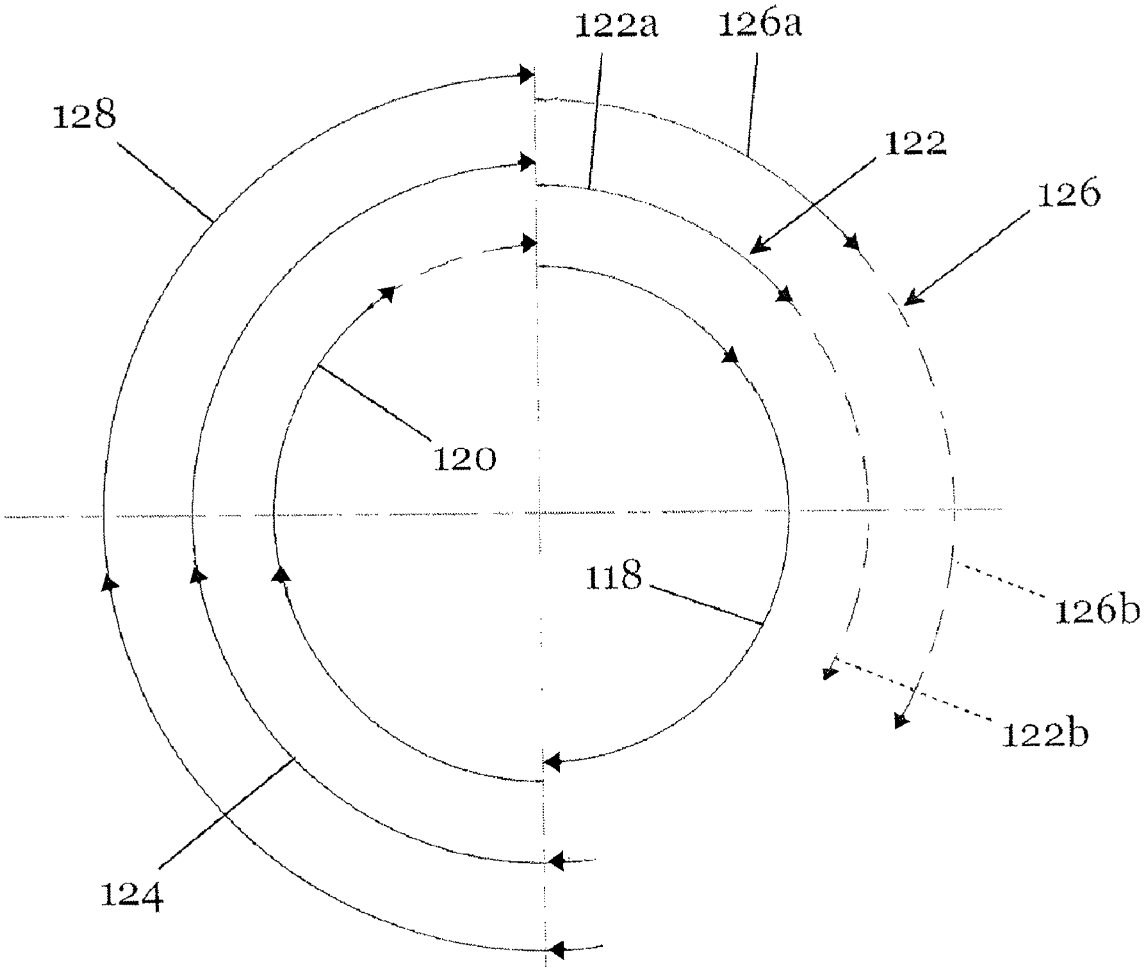
FIG. 11 is a preferred valve operation diagram for six cycle engine operation.

FIG. 11 is a preferred valve function diagram depicting six cycle operation of an engine 30 constructed in accordance with the present invention. The engine 30 has a rotary cam (not shown) that drives one or more of the valves 56, 58, 60 and 62, during six cycle engine operation at one-third engine speed. With reference to a radially innermost right-hand side clockwise-extending air intake valve opening curve 118, the air intake valve 56 (valve 1) is open during the intake stroke (cycle 1) for about 180° of crankshaft rotation before closing. A compressed air discharge valve curve 120 is on the opposite side and shows in a presently preferred implementation that the compressed air discharge valve 58 (valve 2) also stays open for about 180° of crankshaft rotation during the compression stroke (cycle 2). In another preferred implementation, valve 58 stays open for between 5° and 120°.

Located radially outwardly of curve 118 is a first combustion gas intake valve curve 122 depicting operation of the combustion gas intake valve 60 (valve 3) during the first power stroke (cycle 3). As is depicted in FIG. 11, the valve 60 preferably remains open for anywhere between 15° of crankshaft rotation, as indicated by solid line 122*a*, and 150° of crankshaft rotation, as indicated by dashed line 122*b*. The valve 60 is closed where no solid or dashed line exists. In the preferred valve function diagram shown in FIG. 11, the valve 60 is open anywhere from the last 15° of crankshaft rotation to the last 150° of crankshaft rotation before bottom dead center (BBDC).

In another preferred implementation, valve 60 is open between 4° of crankshaft rotation and 90° of crankshaft rotation BBDC. The valve 60 can always be open at the end of the power stroke.

Thereafter, as is depicted by a first radially innermost exhaust valve curve 124, the exhaust valve 62 (valve 4) remains open for substantially the entirety of the first exhaust stroke (cycle 4). Once the first exhaust stroke is completed, a second power stroke (cycle 5) takes places as indicated by radially outermost right hand side curve 126. As is shown by the curve 126, the combustion gas intake valve 60 (valve 3) operates substantially the same as depicted by the first combustion gas intake valve curve 122. Once the second power stroke is completed, the second exhaust stroke (cycle 6) is performed in the manner depicted by radially outermost left hand side curve 128, which preferably is substantially the same as described above with regard to exhaust valve curve 124.

In one preferred embodiment, the combustion gas intake valve 60 preferably is a variably adjustable valve of the type depicted in FIG. 9 and the compressed air discharge valve 58 preferably is a pressure actuated valve such as of the type illustrated in FIG. 8. In another preferred embodiment, all of the valves 56, 58, 60 and 62 are poppet valves.

Figure 12:
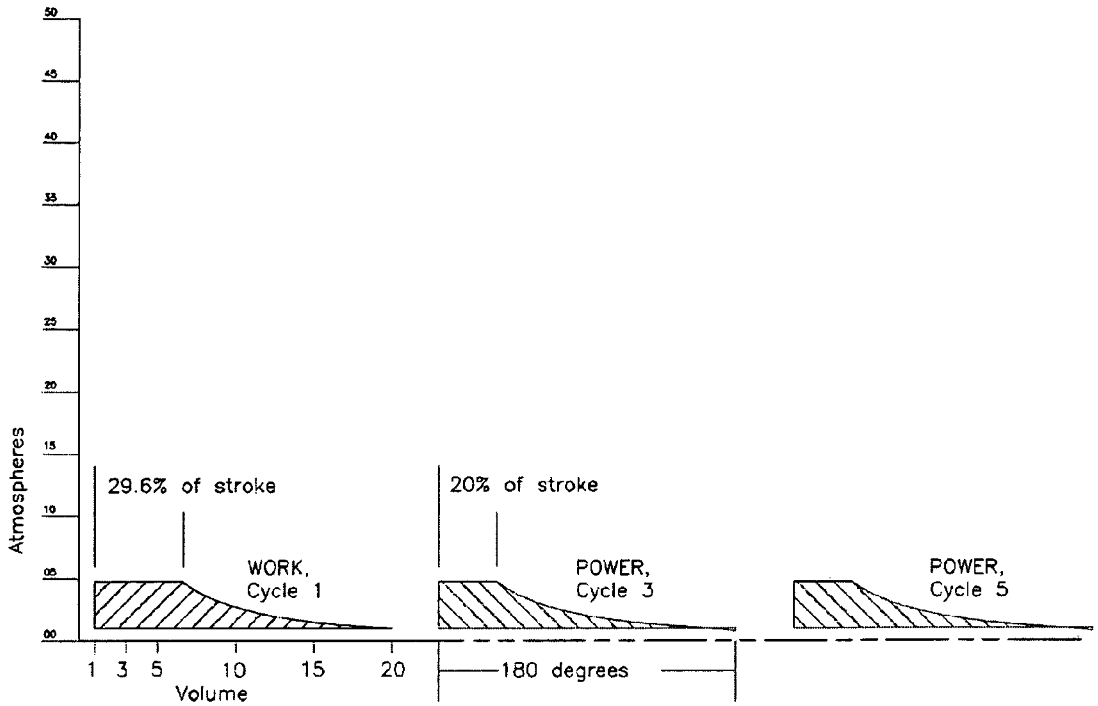
FIG. 12 depicts a first series of pressure-volume plots illustrating low power engine operation.

FIG. 12 illustrates a first series of pressure-volume plots for a low power output case where the compression ratio is approximately 3:1, $V_{combustion}/V_{compression}$[≅]1.3, exhaust gases are discharged into the environment substantially at ambient, and a low (4.3) power output, and 11.4P/7.06C=1.62. In this six cycle Brayton cycle engine operation example, a 3:1 compression ratio is reached during the compression stroke when the piston 32 is within approximately 29.6% of its total stroke. At this point, further piston displacement results in compressing air within the cylinder 34 at a substantially constant pressure for the rest of the stroke (29.6%). In this example, the volume of the compressed air at the pressure developed from the approximately 3:1 compression ratio is expanded approximately 1.3 times per the above $V_{combustion}/V_{compression}$ ratio. Since there are two power strokes resulting from an engine 30 constructed in accordance with the invention using the same piston-cylinder arrangement for both power strokes, each power stroke will result in the working fluid chamber 36 defined by the piston-cylinder arrangement having a maximum volume that is one-half of the volume combustion gases. This means that the combustion gas intake valve 60 will need to be open about 20% of the piston stroke during each power stroke of six cycle engine operation.

Figure 13:
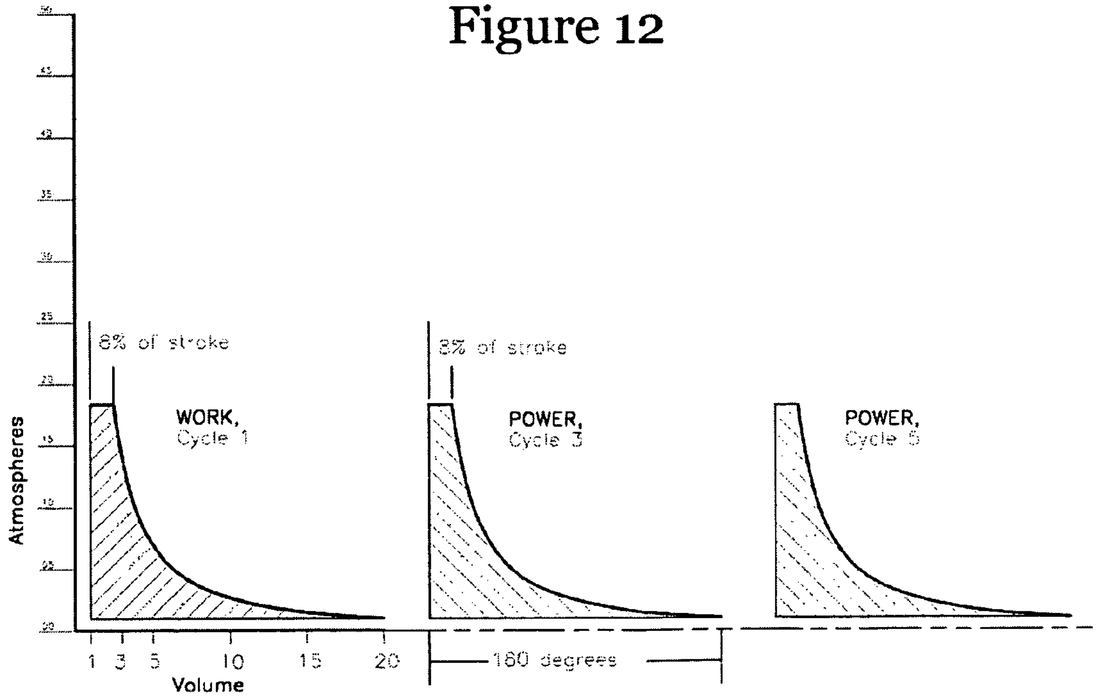
FIG. 13 depicts a second series of pressure-volume plots illustrating moderate-low power engine operation.

FIG. 13 illustrates a second series of pressure-volume plots for a moderate-low power output case where the compression ratio is 8:1, $V_{combustion}/V_{compression}$=2, exhaust gases are discharged into the environment substantially at ambient, 14.7 output, and 29.4P/14.7C=2. In this six cycle Brayton cycle engine operation example, an 8:1 compression ratio is reached during the compression stroke when the piston 32 is within approximately 8% of its total stroke. At this point, further piston displacement results in compressing air within the cylinder 34 at a substantially constant pressure for the rest of the stroke (8%). In this example, the volume of the compressed air at the pressure developed from the 8:1 compression ratio is expanded 2 times per the above $V_{combustion}/V_{compression}$ ratio. Since there are two power strokes resulting from an engine 30 constructed in accordance with the invention using the same piston-cylinder arrangement for both power strokes, each power stroke will result in the working fluid chamber 36 defined by the piston-cylinder arrangement having a maximum volume that is one-half of the volume combustion gases expand as result. This means that the combustion gas intake valve 60 will need to be open about 8% of the piston stroke during each power stroke of six cycle engine operation.

Figure 14:
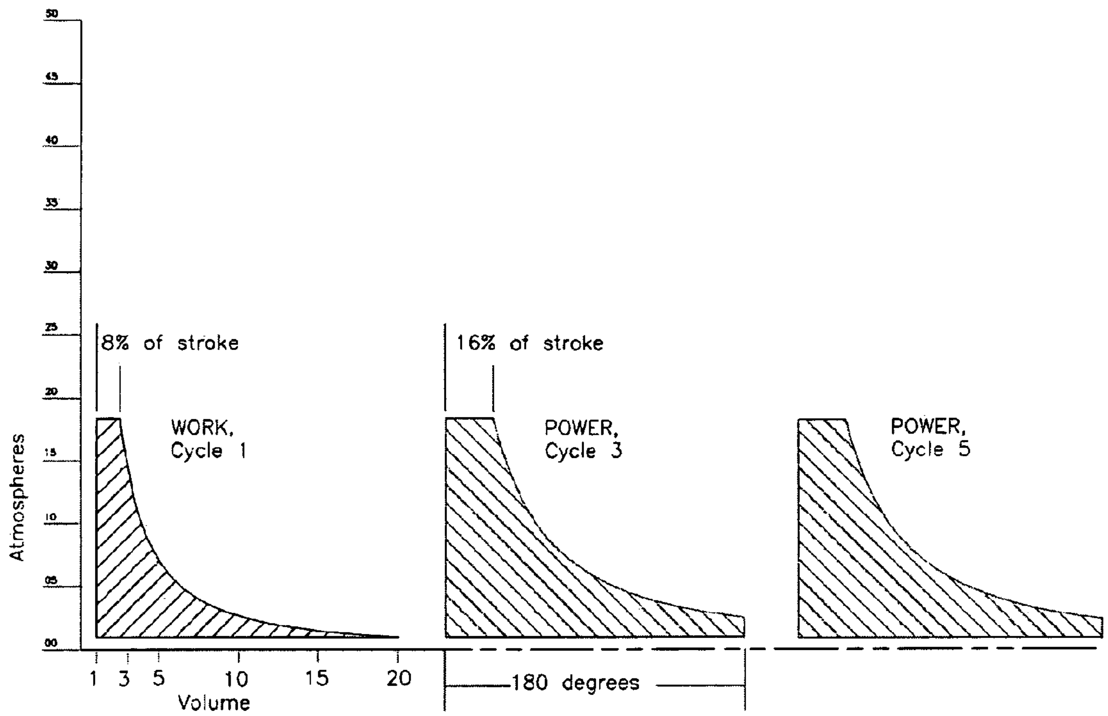
FIG. 14 depicts a first series of pressure-volume plots illustrating moderate power engine operation.

FIG. 14 illustrates a third series of pressure-volume plots for a moderate power output case where the compression ratio is 8:1, $V_{combustion}/V_{compression}[\cong]4$, exhaust gases are discharged into the environment substantially at about 2.5 atmospheres absolute, 40 power output, and 56.6P/14.7C=3.8. In this six cycle Brayton cycle engine operation example, an 8:1 compression ratio is reached during the compression stroke when the piston 32 is within approximately 8% of its total stroke. At this point, further piston displacement results in compressing air within the cylinder 34 at a substantially constant pressure for the rest of the stroke (8%). In this example, the volume of the compressed air at the pressure developed from the 8:1 compression ratio is expanded 4 times per the above $V_{combustion}/V_{compression}$ ratio. Since there are two power strokes resulting from an engine 30 constructed in accordance with the invention using the same piston-cylinder arrangement for both power strokes, each power stroke will result in the working fluid chamber 36 defined by the piston-cylinder arrangement having a maximum volume that is one-half of the volume combustion gases expand as result. This means that the combustion gas intake valve 60 will need to be open about 16% of the piston stroke during each power stroke of six cycle engine operation.

Figure 15:
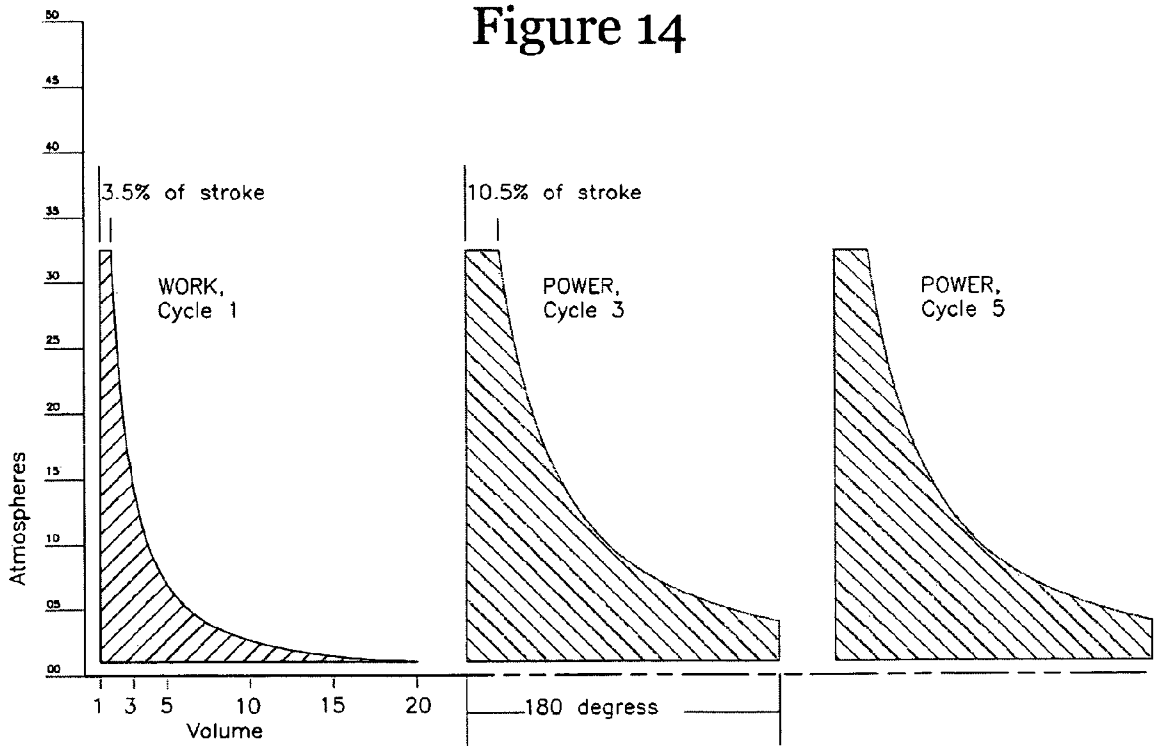
FIG. 15 depicts a first series of pressure-volume plots illustrating high power engine operation.

FIG. 15 illustrates a fourth series of pressure-volume plots for a high power output case where the compression ratio is 12:1, $V_{combustion}/V_{compression}[\cong]6$, exhaust gases are discharged into the environment substantially at about 4.1 atmospheres absolute, 73.3 power output, and 90.9P/14.7C=5.2. In this six cycle Brayton cycle engine operation example, a 12:1 compression ratio is reached during the compression stroke when the piston 32 is within approximately 3.5% of its total stroke. At this point, further piston displacement results in compressing air within the cylinder 34 at a substantially constant pressure for the rest of the stroke (3.5%). In this example, the volume of the compressed air at the pressure developed from the 12:1 compression ratio is expanded 6 times per the above $V_{combustion}/V_{compression}$ ratio. Since there are two power strokes resulting from an engine 30 constructed in accordance with the invention using the same piston-cylinder arrangement for both power strokes, each power stroke will result in the working fluid chamber 36 defined by the piston-cylinder arrangement having a maximum volume that is one-half of the volume combustion gases expand as result. This means that the combustion gas intake valve 60 will need to be open about 10.5% of the piston stroke during each power stroke of six cycle engine operation.

Figure 16:
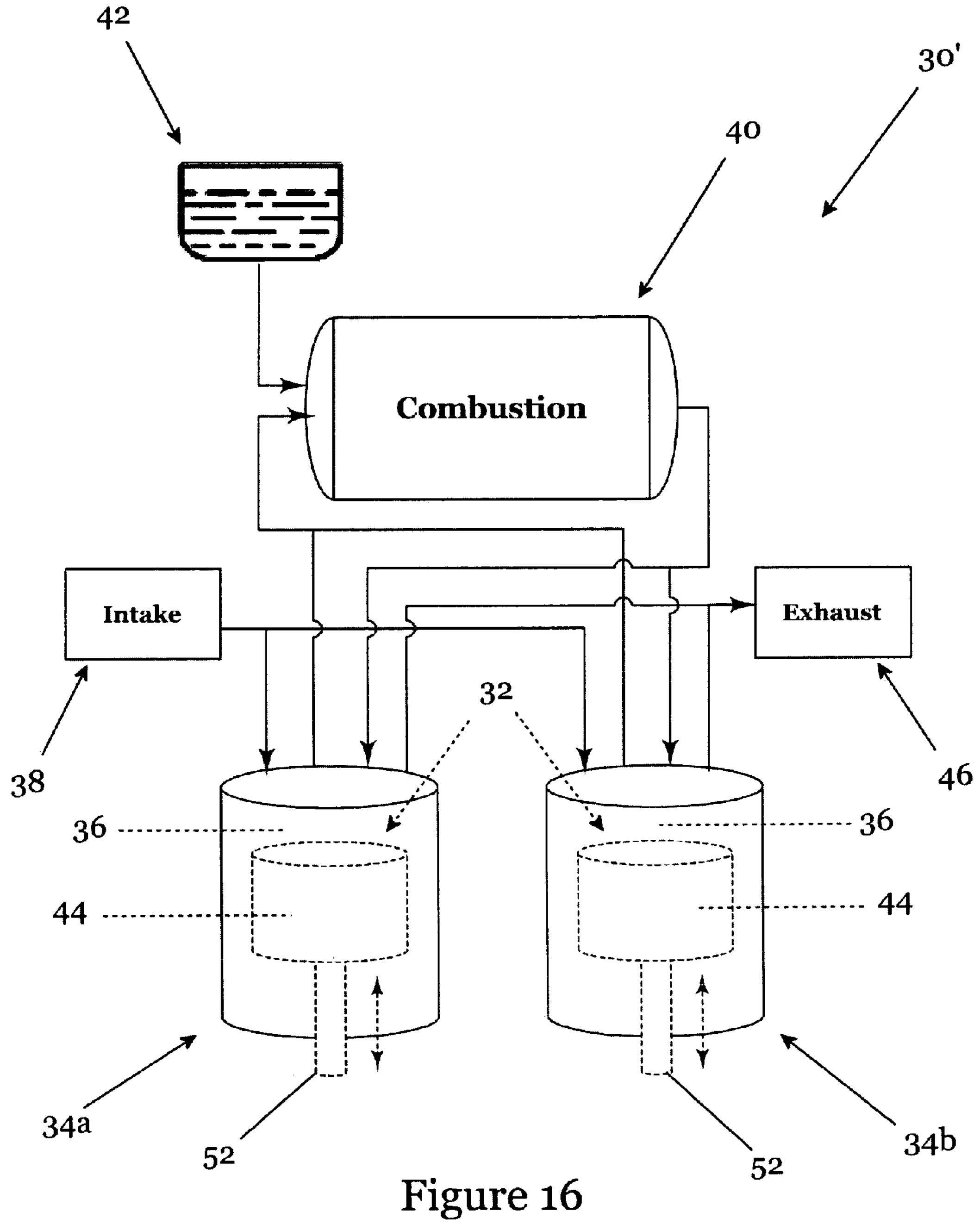
FIG. 16 is a schematic diagram of a second preferred embodiment of a Brayton cycle combustion engine constructed in accordance with the present invention.

FIG. 16 illustrates another preferred embodiment of an engine 30' constructed in accordance with the present invention that is capable of being configured for multiple power stroke operation. Engine 30' is similar to the engine shown in FIG. 3 except that a plurality of cylinders 34*a* and 34*b* are employed. Each cylinder 34*a* and 34*b* preferably includes a valve arrangement having at least a plurality of pairs of valves, e.g., at least three valves, that control air intake, compression, combustion gas intake, and exhaust in a manner that enables multiple power stroke operation.

For example, in a preferred embodiment, each cylinder 34*a* and 34*b* can have a cylinder head the same as or like the cylinder head depicted in FIG. 4 that includes a air intake valve 56, compressed air discharge valve 58, a combustion gas intake valve 60, and an exhaust valve 62. Each cylinder 34*a* and 34*b* preferably operates substantially same as the single cylinder engine 30 shown in one or both of FIGS. 3 and 4 with combustion chamber 40 operation being substantially continuous due to both cylinders 34*a* and 34*b* alternately discharging compressed air to the chamber 40 and accepting combustion gases from the chamber 40 undergoing expansion.

In one preferred implementation, valve timing for each cylinder head of each cylinder 34*a* and 34*b* preferably is controlled to adequately stagger corresponding valve operation and piston displacement so each cylinder 34*a* and 34*b* operates in tandem. In another preferred implementation, valve timing is substantially coincident so each cylinder 34*a* and 34*b* operates substantially in unison having substantially similar valve operation and piston displacement occurring at the same time.

In another preferred implementation using the embodiment shown in FIG. 16, only one of the cylinders, such as cylinder 34*a*, is used to compress air delivered to the combustion chamber 40. Thereafter, after combustion, expanding combustion gases are discharged from the combustion chamber 40 to cylinder 34*a* and cylinder 34*b*. Therefore, two power strokes are employed with one being performed by one cylinder 34*a* and the other being performed by the other cylinder 34*b*.

Figure 17:
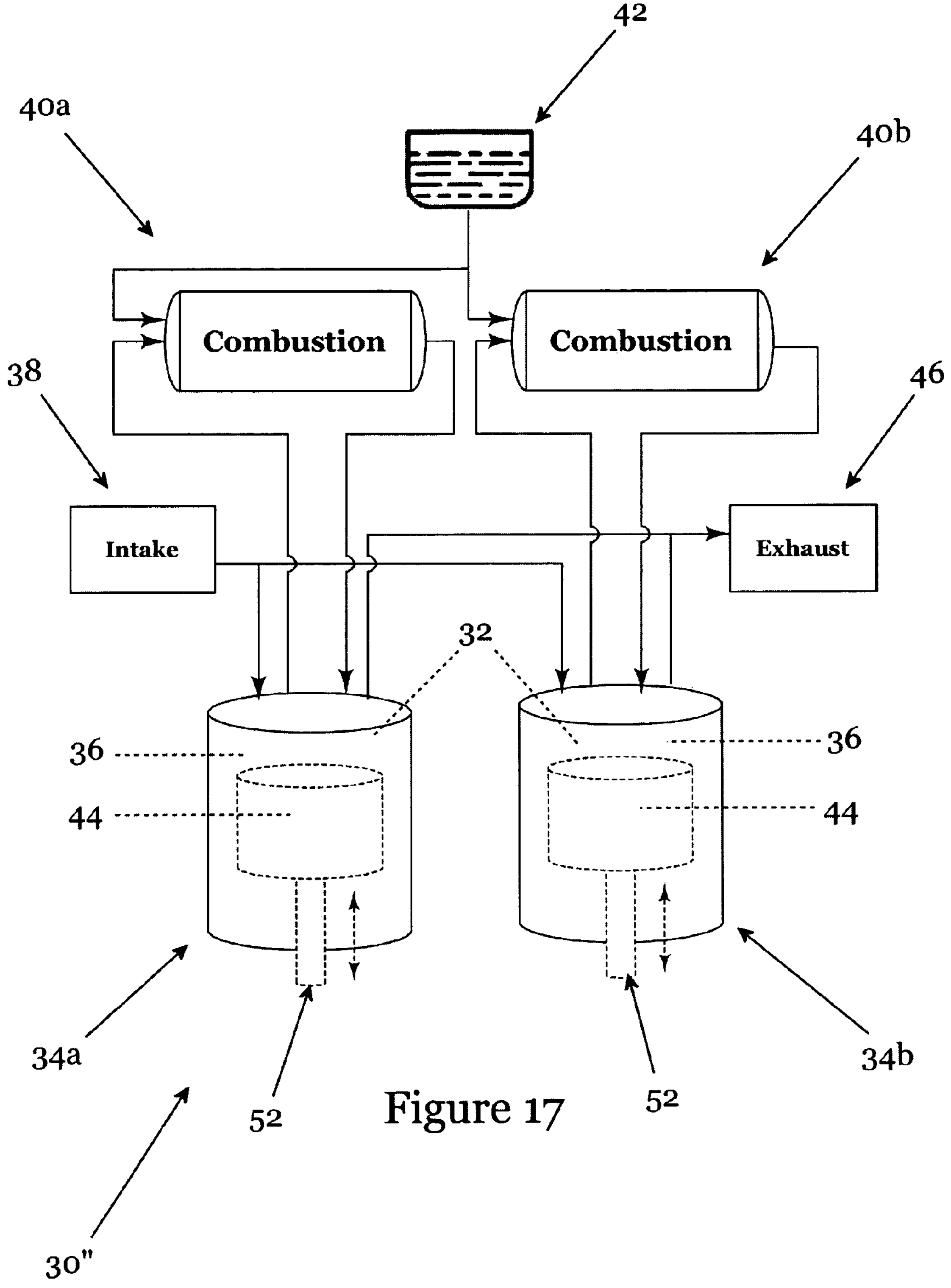
FIG. 17 is a schematic diagram of a third preferred embodiment of a Brayton cycle combustion engine constructed in accordance with the present invention.

FIG. 17 illustrates a still further preferred embodiment of an engine 30" that is also constructed in accordance with the present invention and capable of being configured for multiple power stroke operation. Engine construction is similar to that of the engine 30 shown in FIGS. 3 and 4 and engine 30' illustrated in FIG. 16 except that there are also a plurality of combustion chambers 40B and 40*a* in addition to having a plurality of cylinders 34*a* and 34*b*. While a common intake 38 and exhaust 46 are shared, both cylinders 34*a* and 34*b* and corresponding combustion chambers 40*a* and 40*b* are capable of operating substantially independently. If desired, where a common crankshaft (not shown) and/or camshaft is employed, valve operation can be controlled as discussed above for substantially simultaneous and tandem/staggered operation.

It is an advantage of the engine of the present invention that is configurable to enable fuel to be delivered to the combustion chamber 40 in a manner that achieves and preferably optimizes high pressure pulses timed in relation to the opening of the combustion gas intake valve 58 enabling higher efficiency. It is another advantage of the present invention that timing of the exhaust valve 62 preferably is configured to permit adjustment, including during engine operation and in real time, facilitating achieving high efficiency at a wide range of partial throttle settings. This also advantageously enables higher output to be obtained at very high throttle settings, including wide open throttle. This preferably is done or facilitated by the production of an excessive volume of combustion gases helping to achieve maximum and preferably substantially full combustion gas expansion.

An engine 30 configured in accordance with the present invention preferably is configurable to enable adjustment of the compression ratio by adjusting the timing of the combustion gas intake valve 64 along with the amount of fuel, e.g. fuel consumption rate, combusted in the combustion chamber 40 to enable compression ratio to be raised or lowered during engine operation thereby also enabling a corresponding increase or decrease in the pressure in the chamber 40.

An engine 30 configured in accordance with the present invention can be configured to perform a plurality of power strokes during a complete engine cycle.

In another preferred embodiment, the combustion chamber 40 is equipped with multiple compartments. In a still further embodiment, the combustion chamber 40 is configured to be expandable so as to provide an adjustable volume combustor or the like where combustion volume is variable, including preferably in real time and/or during engine operation.

If desired, water can be injected in addition to fuel into the combustion chamber 40 or just before combustion gases enter the working fluid chamber of the cylinder 34 for limiting combustion temperatures preferably advantageously lowering nitrogen oxide emissions. This can also lower engine temperatures, reducing adverse effects of thermal cycling and the like.

In one preferred embodiment, the intake 38 preferably can be configured to throttle intake are upstream of the intake valve 56 for low idle operation and engine operating adjustment.

It is also to be understood that, although the foregoing description and drawings describe and illustrate in detail one or more preferred embodiments of the present invention, to those skilled in the art to which the present invention relates the present disclosure will suggest many modifications and constructions as well as widely differing embodiments and applications without thereby departing from the spirit and scope of the invention.

It is claimed:

1. A method comprising:

(a) admitting air into a cylinder of a combustion engine during an intake stroke in which a piston moves within the cylinder;

(b) moving the piston in the cylinder to pressurize the air;

(c) directing pressurized air to a combustion chamber disposed exteriorly of the cylinder;

(d) combusting fuel in the combustion chamber using the pressurized air as an oxygen source;

(e) directing combustion gases from the combustion chamber to the cylinder to drive the piston to reciprocate in the cylinder during a power stroke; and (f) exhausting gases from the cylinder during an exhaust stroke, and wherein two power strokes and two exhaust strokes are performed for each intake stroke.

2. A method comprising:

(a) admitting air into a cylinder of a combustion engine;

(b) moving a piston in the cylinder to pressurize the air;

(c) directing pressurized air to a combustion chamber disposed external to the cylinder;

(d) combusting fuel in the combustion chamber using the pressurized air as an oxygen source; and, while combusting fuel in the combustion chamber, (i) directing a first quantity of combustion gases from the combustion chamber to the cylinder to drive the piston to move in the cylinder and generate a first quantity of power, (ii) exhausting gases from the cylinder, then (iii) directing a second quantity of combustion gases from the combustion chamber to the cylinder to drive the piston to move in the cylinder and generate a second quantity of power before directing additional pressurized air to the combustion chamber.

3. The method of claim 2 further comprising, while combusting fuel in the combustion chamber, controlling the exhausting of gases and directing of the second quantity of combustion gases so as to assure complete expansion of combustion gases in the combustion chamber.

* * * * *